(12) United States Patent  (10) Patent No.: US 8,176,259 B2
Van Doren et al.  (45) Date of Patent: May 8, 2012

(54) SYSTEM AND METHOD FOR RESOLVING TRANSACTIONS IN A CACHE COHERENCY PROTOCOL

(75) Inventors: Stephen R. Van Doren, Northborough, MA (US); Gregory Edward Tierney, Chelmsford, MA (US); Simon C. Steely, Jr., Hudson, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1007 days.

(21) Appl. No.: 10/760,813

(22) Filed: Jan. 20, 2004

(65) Prior Publication Data

US 2005/0160209 A1    Jul. 21, 2005

(51) Int. Cl.
  *G06F 13/38* (2006.01)
(52) U.S. Cl. ......... 711/141; 711/E12.032; 711/E12.033; 710/244; 710/120
(58) Field of Classification Search ......... None
  See application file for complete search history.

(56) References Cited

U.S. PATENT DOCUMENTS

| | | | |
|---|---|---|---|
| 5,301,298 A | 4/1994 | Kagan | |
| 5,489,791 A | 2/1996 | Arima | |
| 5,535,116 A | 7/1996 | Gupta | |
| 5,706,463 A | 1/1998 | Ebrahim | |
| 5,802,577 A | 9/1998 | Bhat | |
| 5,829,040 A | 10/1998 | Son | |
| 5,875,467 A | 2/1999 | Merchant | |
| 5,875,472 A | 2/1999 | Bauman | |
| 5,893,922 A | 4/1999 | Baylor | |
| 5,945,710 A | 8/1999 | Oda | |
| 5,958,019 A | 9/1999 | Hagersten | |
| 5,987,571 A | 11/1999 | Shibata | |
| 6,049,851 A | 4/2000 | Bryg | |
| 6,055,605 A | 4/2000 | Sharma | |
| 6,085,263 A | 7/2000 | Sharma | |
| 6,108,737 A | 8/2000 | Sharma | |
| 6,128,677 A | 10/2000 | Miller | |
| 6,138,218 A * | 10/2000 | Arimilli et al. | ............... 711/146 |
| 6,245,603 B1 | 6/2001 | Shinohara | |
| 6,272,602 B1 | 8/2001 | Singhal | |
| 6,345,342 B1 | 2/2002 | Arimilli | |
| 6,351,784 B1 | 2/2002 | Neal et al. | |
| 6,457,100 B1 | 9/2002 | Ignatowski | |
| 6,467,012 B1 | 10/2002 | Alvarez | |
| 6,484,240 B1 | 11/2002 | Cypher | |
| 6,490,661 B1 | 12/2002 | Keller | |
| 6,529,990 B1 | 3/2003 | Kruse | |
| 6,615,319 B2 | 9/2003 | Khare | |
| 6,631,401 B1 | 10/2003 | Keller | |

(Continued)

FOREIGN PATENT DOCUMENTS

JP    10-189951    7/1998

(Continued)

OTHER PUBLICATIONS

Rajeev, Josh, et al., "Checking Cache-Coherence Protocols with TLA+", Kluwer Academic Publishers, 2003, pp. 1-8.

(Continued)

*Primary Examiner* — Mardochee Chery

(57) ABSTRACT

A system comprises a first node that employs a source broadcast protocol to initiate a transaction. The first node employs a forward progress protocol to resolve the transaction if the source broadcast protocol cannot provide a deterministic resolution of the transaction.

41 Claims, 6 Drawing Sheets

U.S. PATENT DOCUMENTS

| | | | |
|---|---|---|---|
| 6,631,448 B2 | 10/2003 | Weber | |
| 6,633,960 B1 | 10/2003 | Kessler | |
| 6,654,858 B1 | 11/2003 | Asher | |
| 6,696,729 B2 | 2/2004 | Adachi | |
| 6,711,653 B1 | 3/2004 | Quach et al. | |
| 6,745,272 B2 | 6/2004 | Owen | |
| 6,751,721 B1 | 6/2004 | Webb | |
| 6,877,056 B2 | 4/2005 | Cypher | |
| 6,883,070 B2* | 4/2005 | Martin et al. | 711/141 |
| 6,922,756 B2* | 7/2005 | Hum et al. | 711/145 |
| 6,931,496 B2* | 8/2005 | Chen et al. | 711/144 |
| 6,993,631 B2 | 1/2006 | Rowlands | |
| 7,032,079 B1 | 4/2006 | Bauman | |
| 7,143,245 B2 | 11/2006 | Tierney | |
| 7,149,852 B2 | 12/2006 | Van Doren | |
| 7,171,521 B2 | 1/2007 | Rowlands | |
| 7,176,097 B2 | 2/2007 | Hiraizumi | |
| 7,222,220 B2 | 5/2007 | Cypher | |
| 7,395,374 B2 | 7/2008 | Tierney | |
| 2001/0034815 A1 | 10/2001 | Dugan | |
| 2002/0009095 A1 | 1/2002 | Van Doren | |
| 2002/0073071 A1 | 6/2002 | Pong | |
| 2002/0129211 A1 | 9/2002 | Arimilli | |
| 2003/0018739 A1 | 1/2003 | Cypher | |
| 2003/0140200 A1 | 7/2003 | Jamil | |
| 2003/0145136 A1 | 7/2003 | Tierney | |
| 2003/0195939 A1* | 10/2003 | Edirisooriya et al. | 709/212 |
| 2003/0200397 A1 | 10/2003 | McAllister | |
| 2003/0217236 A1* | 11/2003 | Rowlands | 711/145 |
| 2004/0002992 A1* | 1/2004 | Cypher et al. | 707/102 |
| 2004/0068624 A1 | 4/2004 | Van Doren | |
| 2004/0123047 A1* | 6/2004 | Hum et al. | 711/141 |
| 2004/0123052 A1 | 6/2004 | Beers | |
| 2004/0181636 A1 | 9/2004 | Martin | |
| 2005/0013294 A1 | 1/2005 | Cypher | |
| 2005/0053057 A1 | 3/2005 | Deneroff | |
| 2005/0060502 A1* | 3/2005 | Tan et al. | 711/150 |
| 2005/0160238 A1 | 7/2005 | Steely, Jr. | |
| 2005/0251626 A1 | 11/2005 | Glasco | |
| 2005/0251631 A1* | 11/2005 | Rowlands et al. | 711/145 |

FOREIGN PATENT DOCUMENTS

| | | |
|---|---|---|
| JP | 2000-232075 | 8/2000 |
| JP | 2003-017578 | 1/2003 |

OTHER PUBLICATIONS

Martin, Milo M.K., et al., "Token Coherence: Decoupling Performance and Correctness", ISCA-30, pp. 1-12, Jun. 9-11, 2003.
Acacio, Manuel E., et al., "Owner Prediction for Accelerating Cache-to-Cache Transfer Misses in a cc-NUMA Architecture", IEEE 2002.
Gharachorloo, Kourosh, et al., "Architecture and Design of AlphaServer GS320", Western Research Laboratory, (Date Unknown).
Gharachorloo, Kourosh, et al., "Memory Consistency and Event Ordering In Scalable Shared-Memory Multiprocessors", Computer Systems Laboratory, pp. 1-14, (Date Unknown).
Non-Final Office Action dated Sep. 17, 2008 for U.S. Appl. No. 10/761,048.
Final Office Action dated Mar. 13, 2007 for U.S. Appl. No. 10/760,652.
Non-Final Office Action dated Jul. 25, 2006 for U.S. Appl. No. 10/760,652.
Notice of Allowance dated Feb. 28, 2008 for U.S. Appl. No. 10/760,651.
Non-Final Office Action dated Sep. 7, 2007 for U.S. Appl. No. 10/760,651.
Non-Final Office Action dated Mar. 28, 2007 for U.S. Appl. No. 10/760,651.
Non-Final Office Action dated Oct. 18, 2006 for U.S. Appl. No. 10/760,651.
Non-Final Office Action dated May 19, 2006 for U.S. Appl. No. 10/760,651.
Non-Final Office Action dated Dec. 19, 2005 for U.S. Appl. No. 10/760,651.
Notice of Allowance dated Jun. 29, 2006 for U.S. Appl. No. 10/761,034.
Final Office Acton dated Apr. 20, 2007 for U.S. Appl. No. 10/760,659.
Non-Final Office Acton dated Nov. 17, 2006 for U.S. Appl. No. 10/760,659.
Non-Final Office Acton dated May 23, 2006 for U.S. Appl. No. 10/760,659.
Final Office Acton dated Mar. 29, 2007 for U.S. Appl. No. 10/761,073.
Non-Final Office Acton dated Oct. 6, 2006 for U.S. Appl. No. 10/761,073.
Notice of Allowance dated Sep. 27, 2006 for U.S. Appl. No. 10/760,463.
Non-Final Office Action dated Mar. 31, 2006 for U.S. Appl. No. 10/760,463.
Final Office Action dated Nov. 4, 2005 for U.S. Appl. No. 10/760,463.
Non-Final Office Action dated Feb. 25, 2005 for U.S. Appl. No. 10/760,463.
Non-Final Office Action dated Sep. 22, 2004 for U.S. Appl. No. 10/760,463.
Notice of Allowance dated Jun. 2, 2009 for U.S. Appl. No. 10/761,047.
Final Office Action dated Feb. 4, 2009 for U.S. Appl. No. 10/761,047.
Non-Final Office Action dated Aug. 20, 2008 for U.S. Appl. No. 10/761,047.
Non-Final Office Action dated Mar. 6, 2008 for U.S. Appl. No. 10/761,047.
Non-Final Office Action dated Sep. 20, 2007 for U.S. Appl. No. 10/761,047.
Final Office Action dated Jun. 14, 2007 for U.S. Appl. No. 10/761,047.
Non-Final Office Action dated Dec. 18, 2006 for U.S. Appl. No. 10/761,047.
Non-Final Office Action dated Jun. 15, 2006 for U.S. Appl. No. 10/761,047.
Scheurich et al., "The Design of a Lockup-free Cache for High-Performance Multiprocessors", Nov. 14-18, 1988 Supercomputing '88 (vol. 1) Proceedings pp. 352-359.
Laudon et al., "The SGI Orgin: A ccNUMA Highly Scalable Server", 1997 International Conference on Computer Architecture, pp. 241-251.
Martin, Milo M.K., et al., "Token Coherence: Decoupling Performance and Correctness", ISCH-30, pp. 1-12, Jun. 9-11, 2003.
Rajeev, Joshi et al., "Checking Cache-Coherence Protocols With TLA+", Kluwer Adacemic Publishers, 2003, pp. 1-8.
Handy, "The Cache Memory Book", 1998, Academic Press second edition, pp. 144-155.
Chen et al., "Write Caching in Distributed Filed Systems", Distributed Computing Systems, 1995., Proceedings of the 15th Int'l Con., May 30-Jun. 2, 1995, pp. 457-466.
Archibald et al., "Cache Coherence Portocols: Evaluation Using a Mulitprocessor Simulation Model", Nov. 1986, ACM Transactions on Computer Systems, pp. 273-298.
Gharachorloo, Kourosh et al., "Architecture and Design of AlphaServer GS320", Western Research Laboratory, (Date Unknown).
Gharachorloo, Kourosh et al., "Memory Consistency and Event Ordering in Scalable Shared-Memory Multiprocessors", Computer Systems Laboratory, pp. 1-14 (Date Unknown).
Martin et al., "Bandwidth Adaptive Snooping", Proceedings of the Eighth International Symposium on High-Performance Computer Architecture (HPCA'02), 2002 IEEE.
Acacio, Manuel et al., "Owner Prediction for Accelerating Cache-to-Cache Transfer Misses in a cc-NUMA Architecture", IEEE 2002.
Notice of Allowance dated Jun. 8, 2006 for U.S. Appl. No. 10/761,044.
Final Office Action dated Mar. 21, 2007 for U.S. Appl. No. 10/760,599.
Non-Final Office Action dated Oct. 6, 2006 for U.S. No. 10/760,599.
Non-Final Office Action dated Apr. 19, 2006 for U.S. Appl. No. 10/760,599.

Final Office Action dated Apr. 18, 2007 for U.S. Appl. No. 10/760,640.
Non-Final Office Action dated Oct. 10, 2006 for U.S. Appl. No. 10/760,640.
Non-Final Office Action dated Apr. 19, 2006 for U.S. Appl. No. 10/760,640.
Final Office Action dated Dec. 4, 2006 for U.S. Appl. No. 10/760,813.
Non-Final Office Action dated Jun. 29, 2006 for U.S. Appl. No. 10/760,813.
Non-Final Office Action dated May 14, 2009 for U.S. Appl. No. 10/761,048.
Examiner's Answer dated Jan. 31, 2008 for U.S. Appl. No. 10/760,599.
Examiner's Answer dated Aug. 22, 2008 for U.S. Appl. No. 10/760,640.
Examiner's Answer dated Jun. 17, 2008 for U.S. Appl. No. 10/760,813.
Examiner's Answer dated Jun. 10, 2008 for U.S. Appl. No. 10/760,652.
Examiner's Answer dated Feb. 8, 2008 for U.S. Appl. No. 10/760,659.
Examiner's Answer dated Mar. 13, 2008 for U.S Appl. No. 10/761,073.
Examiner's Interview Summery dated Jan. 28, 2008 for U.S. Appl. No. 10/760,651.

* cited by examiner

SYSTEM AND METHOD FOR RESOLVING TRANSACTIONS IN A CACHE COHERENCY PROTOCOL

RELATED APPLICATIONS

This application is related to the following commonly assigned patent applications entitled:

"CACHE COHERENCY PROTOCOL WITH ORDERING POINTS," Ser. No. 10/760,640; "SYSTEM AND METHOD TO FACILITATE ORDERING POINT MIGRATION," Ser. No. 10/760,048; "SYSTEM AND METHOD TO FACILITATE ORDERING POINT MIGRATION TO MEMORY," Ser. No. 10/760,599; "SYSTEM AND METHOD FOR CREATING ORDERING POINTS," Ser. No. 10/760,652; "SYSTEM AND METHOD FOR CONFLICT RESPONSES IN A CACHE COHERENCY PROTOCOL WITH ORDERING POINT MIGRATION," Ser. No. 10/760,651; "SYSTEM AND METHOD FOR READ MIGRATORY OPTIMIZATION IN A CACHE COHERENCY PROTOCOL," Ser. No. 10/761,044; "SYSTEM AND METHOD FOR BLOCKING DATA RESPONSES," Ser. No. 10/761,034; "SYSTEM AND METHOD FOR NON-MIGRATORY REQUESTS IN A CACHE COHERENCY PROTOCOL," Ser. No. 10/760,659; "SYSTEM AND METHOD FOR CONFLICT RESPONSES IN A CACHE COHERENCY PROTOCOL WITH ORDERING POINT MIGRATION," Ser. No. 10/761,073; "SYSTEM AND METHOD FOR CONFLICT RESPONSES IN A CACHE COHERENCY PROTOCOL," Ser. No. 10/761,047; "SYSTEM AND METHOD FOR RESPONSES BETWEEN DIFFERENT CACHE COHERENCY PROTOCOLS," Ser. No. 10/760,436, all of which are filed contemporaneously herewith and are incorporated herein by reference.

BACKGROUND

Multi-processor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable fast access to data. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads a memory location, the processor receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

There are two main types of cache coherency protocols, namely, a directory-based coherency protocol and a broadcast-based coherency protocol. A directory-based coherency protocol associates tags with each memory line. The tags can contain state information that indicates the ownership or usage of the memory line. The state information provides a means to track how a memory line is shared. Examples of the usage information can be whether the memory line is cache exclusively in a particular processor's cache, whether the memory line is shared by a number of processors, or whether the memory line is currently cache by any processor.

A broadcast-based coherency protocol employs no tags. Instead, in a broadcast-based coherency protocol, each of the caches monitors (or snoops) requests to the system. The other caches respond by indicating whether a copy of the requested data is stored in the respective caches. Thus, correct ownership and usage of the data are determined by the collective responses to the snoops.

SUMMARY

One embodiment of the present invention may comprise a system that includes a first node that employs a source broadcast protocol to initiate a transaction. The first node employs a forward progress protocol to resolve the transaction if the source broadcast protocol cannot provide a deterministic resolution of the transaction.

Another embodiment of the present invention may comprise a multi-processor network including a first processor node that employs a source broadcast protocol to initiate a transaction. The transaction includes a source broadcast request for data and at least one response from at least one other processor node of the multi-processor network. The first processor node switches from the source broadcast protocol to employ a forward progress protocol to resolve the transaction if the first processor cannot provide a deterministic resolution of the transaction according to the source broadcast protocol.

Another embodiment of the present invention may comprise a computer system that includes a first processor that employs a source broadcast protocol to issue a source broadcast request. At least one other processor employs the source broadcast protocol to further the source broadcast request by providing at least one response to the source broadcast request. The at least one response includes a conflict message that indicates the source broadcast request conflicts with another source broadcast request issued by another processor. The first processor deterministically resolves the source broadcast request by employing a forward progress protocol if the first processor cannot deterministically resolve the source broadcast request according to the source broadcast protocol.

Another embodiment of the present invention may comprise a method that includes employing a source broadcast protocol to initiate a transaction and switching from the source broadcast protocol to a forward progress protocol to resolve the transaction if the transaction cannot be deterministically resolved by employing a source broadcast protocol.

Another embodiment of the present invention may comprise a multi-processor system that includes at least one node that employs a hybrid coherency protocol in which a source snoop protocol is employed to resolve a transaction. The hybrid coherency protocol employs a forward progress protocol to resolve the transaction when the source snoop protocol cannot deterministically resolve the transaction.

DETAILED DESCRIPTION

This disclosure relates generally to a hybrid cache coherency protocol, such as a cache coherency protocol that employs a broadcast source snoop protocol (SSP), and a forward progress protocol (FPP), e.g., a directory-based or null-directory protocol. Characteristic of the hybrid cache coherency protocol, transactions, such as requests for data, are initially transmitted using an SSP broadcast snoop request. If the SSP broadcast snoop request cannot resolve the transaction, the hybrid cache coherency protocol can transition to an FPP mode to resolve the transaction.

In a computer system with a switch based interconnect, the copies of a message (e.g., be it a request, a snoop or a response) that are broadcast to all endpoints of the interconnect (e.g., nodes or processors) can arrive at different endpoints of the interconnect at different times. A copy that targets an interconnect node that is geographically close to the source of the broadcast may, for example, arrive at an early time, while a copy that targets an interconnect node that is geographically remote may arrive at a later time.

When more than one broadcast message is being distributed across a computer interconnect at the same time, the disparity in arrival time of each individual message copy can create a system wide disparity in the perception of transaction ordering. If, for example, a first message A is being broadcast onto a computer interconnect at the same time as a second message B, it is possible that a first subset of the network nodes may receive the messages in an order where A follows B, while a second set of nodes receive the message in an order where B follows A. This phenomenon is referred to as "non-deterministic" system ordering. Such non-deterministic system ordering may increase in magnitude and complexity as more simultaneously, and near simultaneous, broadcast messages are added to the system.

The non-deterministic system ordering that results from broadcast messages in a switch based computer interconnect creates further complication when a broadcast-based coherency protocol, such as a source snoopy coherency protocol, is applied to a switch based computer system. In broadcast-based coherency protocols, the ownership of a cache line can change from one processor to another in response to a single copy of a broadcast snoop message. This migration of ownership in combination with non-deterministic system ordering can create a variety of coherency hazards that may result in one or more processors consuming stale data. This can be illustrated with reference to the example system 10 illustrated in FIG. 1.

Figure 1:
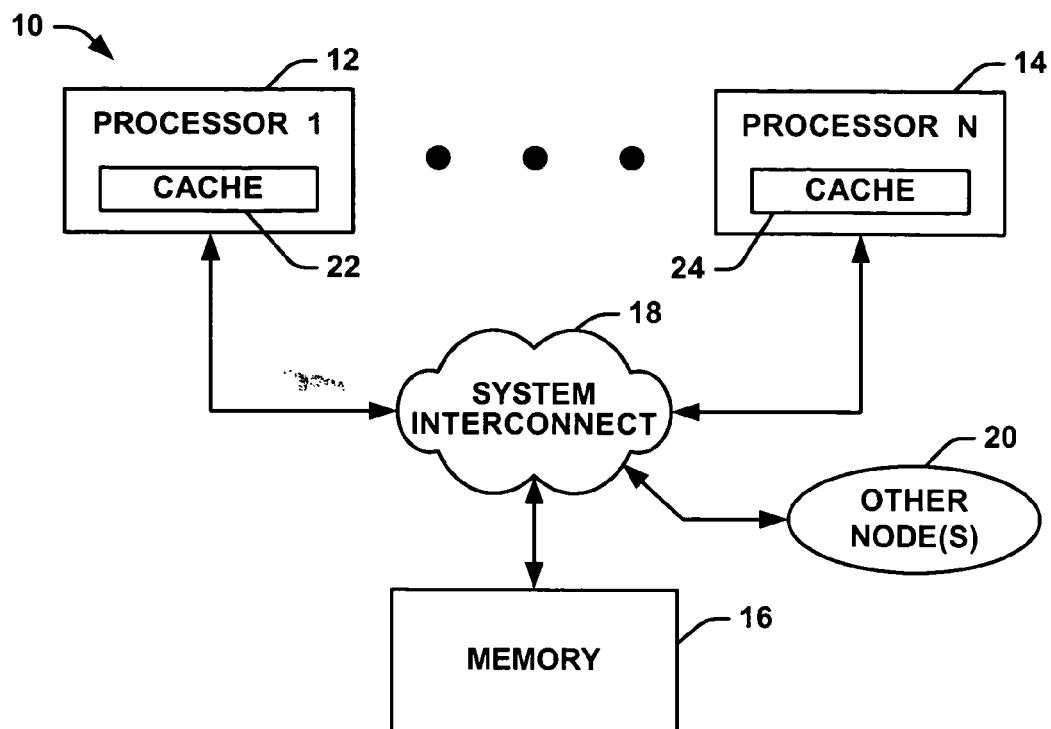
FIG. 1 depicts an example of a multi-processor system.

In the example of FIG. 1, suppose processor 12 issues a broadcast request for a data block that causes owner ship of the block to transfer from processor 14 to processor 12. At the same time, one of the other nodes 20 is also issuing a request for the block. Due to the non-deterministic system ordering phenomenon associated with the system 10, it is possible for a copy of the snoop message from the other node 20 to arrive at processor 12 before ownership has been transferred to processor 12 and for a copy of the snoop message from the other node 20 to arrive at processor 14 after ownership has been transferred to processor 12. As such, it is possible for the other node 20 to perceive that there are no cached owners of the block, which in turn may cause the other node 20 to fetch and cache a stale copy of the block from memory 16 of the system 10.

A solution to the problems caused by non-deterministic ordering is to provide a single, consistent ordering of events with respect to a contended cache block and communicate that ordering to each contending processor such that each may correctly act to provide data, invalidate data or cache data in accordance with the selected ordering and the rules of the coherency protocol. The hybrid coherency protocol described herein provides a deterministic solution to the above-mentioned problems by implementing and following a methodology for providing consistent system ordering.

The hybrid coherency protocol attempts to identify at least one processor as being the first processor in the ultimate single consistent ordering based solely upon snoop responses in the SSP. This allows at least one processor to make forward progress with the lowest possible latency. This is accomplished by identifying at most one processor in the system as the system ordering point based upon cache state and choosing the first snoop to arrive at this ordering point as the first processor in the single consistent system ordering. All other contending processors are simply identified collectively as "not first."

The identification of the "first-ordered" or "not first" classification is communicated back to each contending processor. In the case of the "first-ordered" processor, this is done by means of a successful data or not data response message. An ownership data response (e.g., a D-DATA message described herein), in particular, is indicative of "first-ordered" processor status. In the case of the "not first" processors, the classification is communicated by means of conflict messages. These conflict messages include CONFLICT, read conflict (RD-CONF) and a FPP conflict message, which are described below.

A "first-ordered" transaction is allowed to make forward progress immediately, such as by caching data and retiring the associated transaction according to the source broadcast protocol. The group of "not first" processor requests are ordered subsequent to the first-ordered transaction. In the hybrid coherency protocol described herein, this group of processors can be ordered using a standard FPP which relies on a single ordering point at the home node associated with the contended cache block. While a variety of FPPs can be employed in the system 10, each FPP typically utilizes message arrival order at the home node to determine the single consistent ordering of transactions. For instance, some may employ retry schemes that may cause starvation mitigation schemes to impact the ultimate ordering that is selected. Others may employ queuing or blocking schemes that may cause interconnect arbitration policies to have a more profound effect on the ultimate ordering. The group of "not first" processor requests are serviced and completed as they are ordered by the FPP implemented in the system 10.

The methodology for providing consistent system ordering described herein is supported by protocol features implemented by the hybrid coherency protocol. One protocol feature implemented in the hybrid coherency protocol is a FPP conflict message. The FPP conflict message is included to support the ability of FPP protocol to ensure forward progress in ordering and servicing the group of "not first" requests. Specifically, the operation of the SSP against a contended cache block for which "not first" requests have been handed off to the FPP, in parallel with the attempted processing of "not first" requests to the same block by the FPP, may inhibit indefinitely the progress of ordering and servicing the "not first" requests. The special FPP conflict inhibits the classification of requests as "first-ordered" until the other requests that have previously been classified as "not first" have been serviced according to the FPP.

Another protocol feature implemented in the hybrid coherency protocol is a MACK/MACK-ACK ordering point migration acknowledgment support. This feature allows a "first-ordered" request to migrate a system ordering point safely. In particular, this feature allows no other requests to be identified as "first-ordered" requests until the ordering point migration associated with the original "first-ordered" request has been successfully completed.

The hybrid protocol may also implement a number of optimizations. Many of these optimizations are related to the types of messages (e.g., S-DATA and RD-CONF messages) implemented in the hybrid coherency protocol described herein. S-DATA messages indicate that the data it carries was up to date with the system's ordering point at the time of the associated snoop. It does not necessarily indicate "first-ordered" request status, however. For example, write snoops that followed the S-DATA message in order at the ordering point of origin may have presented invalidate snoops to its source processor before a corresponding read request was even generated. The S-DATA message, and the associated S-state data state, thus can be ambiguous indicators that, when combined with certain conflict states, enable optimizations to be implemented in the system that can avoid having to employ the FPP. Some of these optimizations are set forth herein.

According to one optimization, if a read request receives an S-DATA response and a CONFLICT response, it is not a "first-ordered" request. Yet it can still correctly use a "snapshot" of the data provided by the S-DATA, so long as it does not cache the data. This optimization is referred to herein as "Fill Invalid," which can be used to allow a read request to make forward progress without resorting to the FPP. The fill-invalid optimization affords the requesting processor a single use of the data received in the S-DATA response. If the requesting processor requires the data after the allowed single use, the processor will need to issue another request for the data, such as initiated by initiating the transaction in the source broadcast protocol According to another optimization, if a read request receives an S-DATA response but no conflict response, the request still is identified as "not first" since the request did not receive a D-DATA response. Nevertheless, the conflict and data states indicate that the requesting processor has received valid data from the ordering point and that the ordering point has not been migrated. Thus, the data can safely be cached and the read request retired without resorting to the FPP.

According to a further optimization, if a read request receives M-DATA and an associated conflict state machine (described herein) resolves to the RD-CONF state, then the request is not classified as "first-ordered" as long as no D-DATA was also received. The M-DATA response indicates that there is no cached ordering point and that the only conflicting requests are also read requests. As a result, the circumstances in the system are such that the ordering point will not migrate. Thus, the data can safely be cached and the read request retired without resorting to the FPP.

The hybrid coherency protocol, including its features and optimizations associated therewith, will be better understood when described in reference to the Figures and Tables described herein. FIG. 1 depicts an example of a system 10 in which a hybrid cache coherency protocol of the present invention may be implemented. The system 10 illustrates a multi-processor environment that includes a plurality of processors 12 and 14 (indicated at PROCESSOR 1 through PROCESSOR N, where N is a positive integer (N>1)). The system 10 also includes memory 16 that provides a shared address space. For example, the memory 16 can include one or more memory storage devices (e.g., dynamic random access memory (DRAM)).

The processors 12 and 14 and memory 16 define nodes in the system that can communicate with each other via requests and corresponding responses through a system interconnect 18. For example, the system interconnect 18 can be implemented as a switch fabric or a hierarchical switch. Also associated with the system 10 can be one or more other nodes, indicated schematically at 20. The other nodes 20 can correspond to one or more other multi-processor systems connected to the system interconnect 18, such as through an appropriate interconnect interface (not shown).

Each of the processors 12 and 14 includes at least one corresponding cache 22 and 24. For purposes of brevity, each of the respective caches 22 and 24 is depicted as unitary memory devices, although the caches may include a plurality of memory devices or different cache levels. Each of the caches 22 and 24 includes a plurality of cache lines. Each cache line has an associated tag address that identifies corresponding data stored in the line. The cache lines can also include information identifying the state of the data for the respective lines.

The system 10 thus employs the caches 22 and 24 and the memory 16 to store blocks of data, referred to herein as "memory blocks." A memory block can occupy part of a memory line, an entire memory line or span across multiple lines. For purposes of simplicity of explanation, however, it will be assumed that a "memory block" occupies a single "memory line" in memory or a "cache line" in a cache. Additionally, a given memory block can be stored in a cache line of one or more caches as well as in a memory line of the memory 16.

Each cache line can also include information identifying the state of the data stored in the respective cache. A given memory block can be stored in a cache line of one or more of the caches 22 and 24 as well as in a memory line of the memory 16, depending on the state of the line. Whether a cache line contains a coherent copy of the data also depends on the state of the cache line. Certain states employed by the coherency protocol can define a given cache line as an ordering point for the system 10 employing a broadcast-based protocol. An ordering point characterizes a serialization of requests to the same memory line (or memory block) that is understood and followed by the system 10.

The system 10 implements the hybrid cache coherency protocol described herein to manage the sharing of memory blocks so as to help ensure coherence of data. The hybrid cache coherency protocol of the system 10 utilizes a plurality of states to identify the state of each memory block stored in respective cache lines of the caches 22 and 24 and the memory 16. The coherency protocol establishes rules for transitioning between states, such as if data is read from or written to memory 16 or one of the caches 22 and 24.

As used herein, a node that issues a request, such as a read or write request, defines a source node. Other nodes within the system 10 are potential targets of the request. Additionally, each memory block in the system 10 can be assigned a home node that maintains necessary global information and a data value for that memory block. When a source node issues a source broadcast snoop request for data, an entry associated with the request is allocated in a miss address file (MAF). The MAF maintains information associated with, for example, the address of the data being requested, the type of request, and response information received from other nodes in response to the request. The MAF entry for the request is maintained until the request associated with the MAF is complete.

For example, when a source node, such as the processor 12, requires a copy of a given memory block, the source node typically first requests the memory block from its local, private cache by identifying the tag address associated with the memory block. If the data is found locally, the memory access is resolved without communication via the system interconnect 18. When the requested memory block is not found locally, the source node 12 can request the memory block from the system 10, including the memory 16. In addition to the request identifying an address associated with the requested memory block, the request usually identifies the type of request or command being issued by the requester. Whether the other nodes 14 and the memory 16 will return a response depends upon the type of request, as well as the state of the identified memory block contained in the responding nodes. The hybrid cache coherency protocol implemented by the system 10 defines the available states and possible state transitions.

A set of cache states that can be included in the hybrid cache coherency protocol described herein is depicted below in Table 1. Each cache line of the respective caches 22 and 24 of the processors 12 and 14 may be associated or tagged with one of the cache states in table 1. Since there are eight possible states, the state information can be encoded by a three-bit data word, for example.

TABLE 1

| STATE | DESCRIPTION |
|---|---|
| I | Invalid - The cache line does not exist. |
| S | Shared - The cache line is valid and unmodified by caching processor. Other processors may have valid copies, and the caching processor cannot respond to snoops by returning data. |
| E | Exclusive - The cache line is valid and unmodified by caching processor. The caching processor has the only cache copy in the system and may respond to snoops by returning data. |
| F | First (among equals) - The cache line is valid and unmodified by caching processor. Other processors may have valid copies, and caching processor may respond to snoops by returning data. |
| D | Dirty - The cache line is valid and more up-to-date than memory. The cache line has not been modified by the caching processor, and the caching processor has the only cache copy in the system. The caching processor must respond to snoops by returning data and must write data back to memory upon displacement. The dirty state permits a modified block to be transferred between caches without updating memory. |
| M | Modified - The cache line is valid and has been modified by the caching processor. The caching processor has the only cache copy in the system, and the caching processor must respond to snoops by returning data and must write data back to memory upon displacement. |
| O | Owned - The cache line is valid and more up-to-date than memory. The caching processor cannot modify the cache line. Other processors may have valid copies, and the caching processor must respond to snoops by returning data and must write data back to memory upon displacement. |
| T | Transition - The cache line is in transition. The cache line may be transitioning from O, M, E, F or D to I, or the line may be transitioning from I to any one of the valid states. |

As mentioned above, the state of a cache line can be utilized to define a cache ordering point in the system 10. In particular, for a protocol implementing the states set forth in Table 1, a processor including a cache line having one of the states M, O, E, F or D may be referred to as an owner processor or node. The owner node can serve as a cache ordering point for the data contained in the cache line for transactions in the broadcast-based protocol. An owner processor (e.g., processor 12 or 14) that serves as the cache ordering point is capable of responding with data to SSP snoops for the data. For example, processor 14 may be an owner processor for particular data and thus can provide a copy of the data to another cache 12. The type of data returned by an owner processor depends on the state of the data stored in the processor's cache. The response may also vary based on the type of request as well as whether a conflict exists. The memory 16 seeks to return a copy of the data stored in the memory. The memory copy of the data is not always a coherent copy and may be stale (e.g., when there is a modified copy of the data cache by another processor).

The hybrid cache coherency protocol described herein can provide for ordering point migration in which a cache ordering point is transferred from cache of a target processor to a source processor in response to a source broadcast read request. For example, a target node (e.g., processor 14) including an M-state cache line can, in response to a source broadcast read request, provide an ownership data response to a source node (e.g., processor 12), and the source node cache line transitions to the D-state. In response to completion of the ordering point transfer, the target processor 14 cache line transitions to the I-state. The ordering point is thus transferred (i.e., the ordering point migrates) from the target processor 14 to the source processor 12.

To mitigate the vulnerability of the ordering point during migration, the MACK/MACK-ACK sequence can be implemented in the hybrid coherency protocol. This allows a "first-ordered" request to safely migrate a cache ordering point for the system 10. More specifically, the MACK/MACK-ACK feature allows no other requests to be identified as "first-ordered" requests until the original "first-ordered" request associated with the ordering point migration has finished migrating the ordering point. According to the MACK/MACK-ACK feature, the cache line of the target processor 14 can transition to the T-state while the ordering point migration is pending. The source processor 12 can provide a message that acknowledges when the ordering point has successfully migrated (e.g., a migration acknowledgement or "MACK" message). The cache line of the target processor 14 can further transition from the T-state to the I-state in response to receiving the MACK message from the source processor 12 because the MACK message indicates that the ownership state is fully established at the new owner, i.e., the source processor. The target processor 14 can respond to the MACK message by providing a further acknowledgement message back to the source processor 12 (e.g., a MACK acknowledgement or MACK-ACK message). The source broadcast read request by the source processor 12 that initiated the migration sequence can be considered completed in response to receiving the MACK-ACK message from the target processor 14.

The processors 12 and 14 of the system 10 can obtain copies of desired data by issuing data requests in either the SSP or FPP portion of the hybrid cache coherency protocol implemented in the system. A list of example data requests that can be included in the SSP portion of the hybrid cache coherency protocol described herein, and thus issued through a source broadcast request by a processor (e.g., processors 12 and 14), is depicted below in Table 2.

TABLE 2

| Request Type | Request | Request Description |
|---|---|---|
| Reads | XREADN | Broadcast read line code: Non-migratory read request. |
| | XREAD | Broadcast read line data: Read request. |
| | XREADC | Broadcast read current (non-coherent read). |
| Writes | XRDINVAL | Broadcast read and invalidate line with owner. |
| | XUPGRADE | Broadcast invalidate line - upgrade un-writable copy. |
| Memory Updates | XWRITE | Broadcast memory write-back - victim write. |
| | XUPDATE | Broadcast memory update - victim write. |
| | XWRITEC | Broadcast write coherent. |
| Special Commands | MACK | Broadcast migration acknowledgment. |
| | XINVAL | Broadcast invalidate. |

According to the hybrid cache coherency protocol described herein, source processors 12 and 14 issue data requests initially as broadcast snoop requests using the SSP commands set forth in Table 2. If the transaction resulting from the snoop requests cannot be resolved deterministically in the SSP (e.g., due to a conflict), the system 10 can transition to the FPP and the requests can be reissued using FPP commands to provide a deterministic resolution of the transaction.

Whenever a broadcast read or write snoop is issued by a source node (e.g., source processor 12) in the system 10, target nodes of the system (e.g., target processor 14, memory 16, and nodes 20) may issue an SSP response to the snoop. A list of example SSP responses that may be included in the hybrid cache coherency protocol described herein is depicted below in Table 3.

TABLE 3

| SSP Broadcast Response | Response Description |
|---|---|
| D-DATA | Ownership data response - Corresponding snoop command was the first to arrive at a cache ordering point (M, O, D, E, F state); the ordering point is being transferred to the requesting processor. At most, one D-DATA command can exist per cache line at any given time. |
| S-DATA | Shared data response - Data is being returned from a cache ordering point; the ordering point is not being transferred. |
| M-DATA | Memory data response - Data is being returned from home memory. |
| MISS | General snoop response: Snoop failed to match a cache or MAF entry at a snoop target. Snoop matched at a snoop target and invalidated a cache line at the target. Acknowledgement for broadcast invalidate line requests. Acknowledgement for broadcast migration acknowledgement requests. Acknowledgement for broadcast victim write requests. |
| SHARED | Snoop hit shared - Read snoop matched on a cache line in the S-state. |
| CONFLICT | Snoop conflict - Snoop matched a valid write MAF (read or write) or T-state cache line at a target processor. |
| RD-CONF | Snoop read conflict - A special case conflict where a snoop matched a valid read MAF. |

TABLE 3-continued

| SSP Broadcast Response | Response Description |
|---|---|
| FPP | Snoop hit FPP-Mode MAF - Some other processor is trying to access the same cache line and has already transitioned to the forward progress protocol (FPP) mode. This response is required for forward progress/starvation avoidance. |

When a source node (e.g., source processor 12) issues a source broadcast request for data, each of the target nodes (e.g., target processor 14, memory 16, and nodes 20) having a copy of the requested data may provide a data response. In the hybrid cache coherency protocol described herein, there are three different types of data responses: shared data responses (S-DATA), dirty data responses (D-DATA), and memory data responses (M-DATA). It is thus possible that, in response to a source broadcast request for data, the source processor 12 can receive several different data responses. Accordingly, the source processor 12 requester can employ a data state machine associated with the MAF entry for the source broadcast request to manage filling data in the cache of the source processor.

Figure 2:
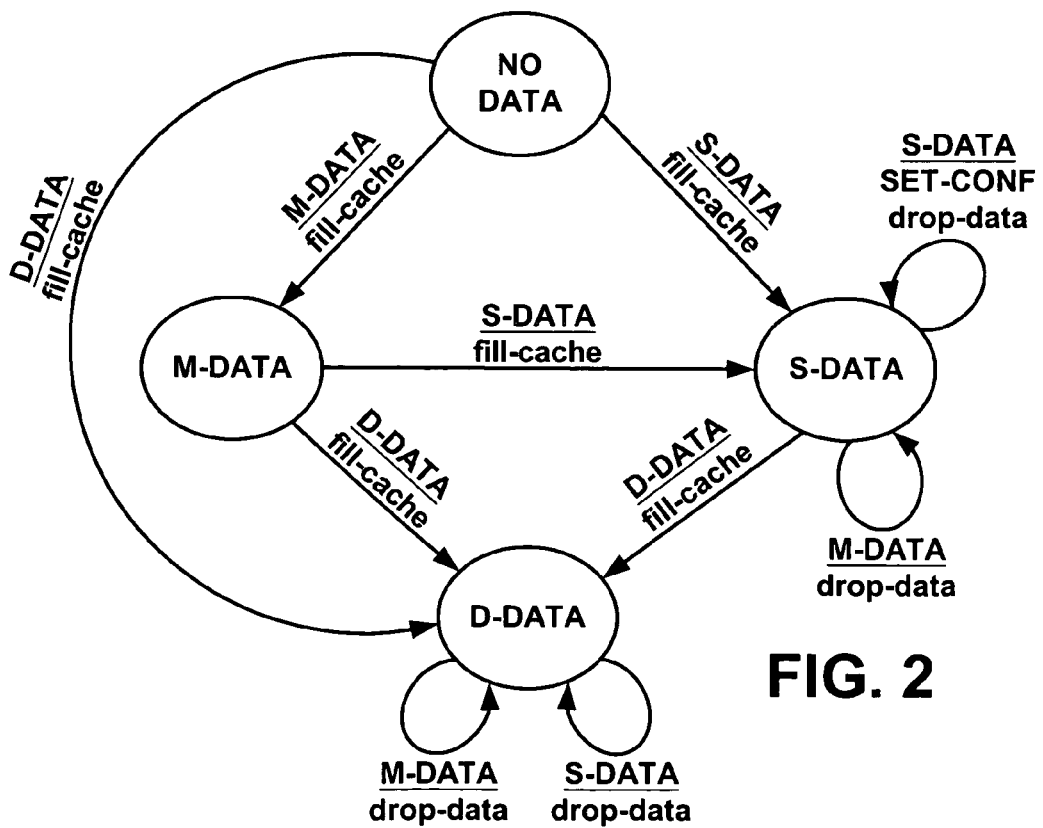
FIG. 2 depicts an example of a data state flow diagram that may be implemented in a coherency protocol.

FIG. 2 depicts an example of a data state diagram that represents operation of a data state machine that can be utilized to manage data responses returned to a source node in the SSP protocol. The example data state diagram of FIG. 2 implements the data responses set forth in Table 3. As shown in the data state diagram of FIG. 2, D-DATA overrides both M-DATA and S-DATA, meaning that D-DATA will result in a cache fill, overwriting M-DATA or S-DATA that is received prior to the D-DATA. Additionally, S-DATA will overwrite M-DATA, but not D-DATA. Thus, D-DATA has priority over M-DATA and S-DATA, and S-DATA has priority over M-DATA. M-DATA results in a cache fill only if no other types of data have been received. If a requester has received a first data response and lower priority data is subsequently received at a requester, the requester can drop the subsequent, lower priority data. Also, as shown in FIG. 2, if multiple S-DATA responses are received, a SET-CONF condition exists and a CONFLICT message is provided to the conflict state machine associated with the MAF.

A target node can provide an ownership data response that includes D-DATA, for example, when the processor has an ownership state (e.g., M, O, E, F or D) associated with the cache data in the SSP protocol. It is the state of the cache data that defines the node (processor) as a cache ordering point for the data. When a processor responds with D-DATA, the ordering point is transferred to the requesting processor. S-DATA is a shared data response that indicates data is being returned from a cache ordering point, although the ordering point itself is not being transferred to the requester. An S-DATA response also indicates that a copy of the data may be in one or more other caches. An M-DATA response can be provided by memory (e.g., a home node) by returning the present value for the data stored in memory. It is possible that the M-DATA is stale and not up-to-date.

Examples of processor snoop responses to source broadcast snoop requests that can occur in the system 10 and the target node state transitions that result therefrom are provided in Table 4. The state transitions set forth in Table 4 assume that no conflicts are encountered in response to the respective commands. Conflict conditions can affect state transitions, as described herein. As shown in Table 4, the response to the source node varies depending on the type of broadcast snoop request received at the target node and the cache state of the target node when the snoop request is received.

TABLE 4

| Source Node Request Type | Source Node Request | Target Node Cache State | Target Node Next Cache State | Response to Source Node |
|---|---|---|---|---|
| Reads | XREADN | T | Unchanged | Conflict |
|  | XREADN | I | Unchanged | MISS |
|  | XREADN | S | Unchanged | Shared |
|  | XREADN | E, F | F | S-DATA |
|  | XREADN | M, D, O | O | S-DATA |
|  | XREAD | T | Unchanged | Conflict |
|  | XREAD | I | Unchanged | MISS |
|  | XREAD | S | Unchanged | Shared |
|  | XREAD | E, F | F | S-DATA |
|  | XREAD | D, O | O | S-DATA |
|  | XREAD | M | T | D-DATA |
|  | XREADC | T | Unchanged | Conflict |
|  | XREADC | S, I | Unchanged | MISS |
|  | XREADC | M, D, O, E, F | Unchanged | S-DATA |
| Writes | XRDINVAL | T | Unchanged | Conflict |
|  | XRDINVAL | S, I | I | MISS |
|  | XRDINVAL | M, D, O, E, F | T | D-DATA |
|  | XUPGRADE | S, I | I | MISS |
|  | XUPGRADE | M, D, O, E, F, T | Error - XUPGRADE should not find an owner or T-state target node. | |
| Memory Updates | XWRITE | S, I | Unchanged | MISS |
|  | XWRITE | M, D, O, E, F, T | Error - XWRITE should not find an owner or T-state target node. | |
| Special Commands | MACK | T | I | MISS |
|  | MACK | M, D, O, E, F, S, I | Error - MACK should always find a T-state target node. | |
|  | XINVAL | T, I | Unchanged | MISS |
|  | XINVAL | M, D, O, E, F, S | Error - XINVAL should not find an owner or S-state target node. | |

Referring to Table 4 and FIG. 1, when a source node (e.g., source processor 12) issues a source broadcast request for data, each of the target processors or nodes (e.g., target processor 14 and nodes 20) may provide a non-data response. As listed in Table 3, the hybrid cache coherency protocol employs five different types of non-data responses: a general snoop response (MISS), a snoop hit shared response (SHARED), a snoop conflict response (CONFLICT), a snoop read conflict response (RD-CONF), and a snoop hit FPP mode MAF response (FPP). It is thus possible that, in response to a source broadcast request for data, the source processor 12 can receive several different non-data responses. The CONFLICT, RD-CONF, and FPP non-data responses help account for the fact that there may be more than one source processor issuing requests for the same data at any given time. Accordingly, the source processor 12 requester can employ a conflict state machine associated with the MAF entry for the source broadcast request to manage conflicts that may result from any given SSP broadcast request for data.

The hybrid cache coherency protocol employs conflict states that are assigned to a miss address file (MAF) entry for an outstanding SSP broadcast snoop request. The conflict states are used to determine how to provide a deterministic resolution for conflicts that arise in SSP broadcast snoop request transactions. The conflict states include a read conflict (RD-CONF) state and a conflict (CONFLICT) state. In general, the RD-CONF state is assigned to a MAF entry in a conflict scenario in which the SSP broadcast snoop requests that conflict with the MAF entry are SSP broadcast read snoop requests. In general, the CONFLICT state is assigned to a MAF entry in a conflict scenario in which the broadcast snoop requests that conflict with the MAF entry include broadcast write snoop requests. The CONFLICT state can also be assigned when starvation occurs.

The implementation of the CONFLICT and RD-CONF states is useful in multi-processor systems employing a hybrid cache coherency protocol, such as the SSP/FPP hybrid cache coherency protocol described herein. In a conflict scenario in which a source processor receives a data response and a RD-CONF response to a broadcast snoop request for data, the source processor can resolve the conflict and complete the transaction by filling the data in a cache associated with the source processor. In some circumstances where a source processor receives a data response and a CONFLICT response to a source broadcast request, the source processor can employ the SSP to resolve the CONFLICT and complete the transaction by filling the data. In other circumstances where a source processor receives a data response and a CONFLICT response to a source broadcast request and is unable to resolve the CONFLICT by employing the SSP, the source processor can employ the FPP to resolve the CONFLICT and complete the transaction by filling the data, e.g., by reissuing the request for the data using a corresponding FPP request. The hybrid cache coherency protocol described herein can thus provide a deterministic approach for resolving source broadcast snoop requests in conflict scenarios as well as non-conflict scenarios.

Figure 3:
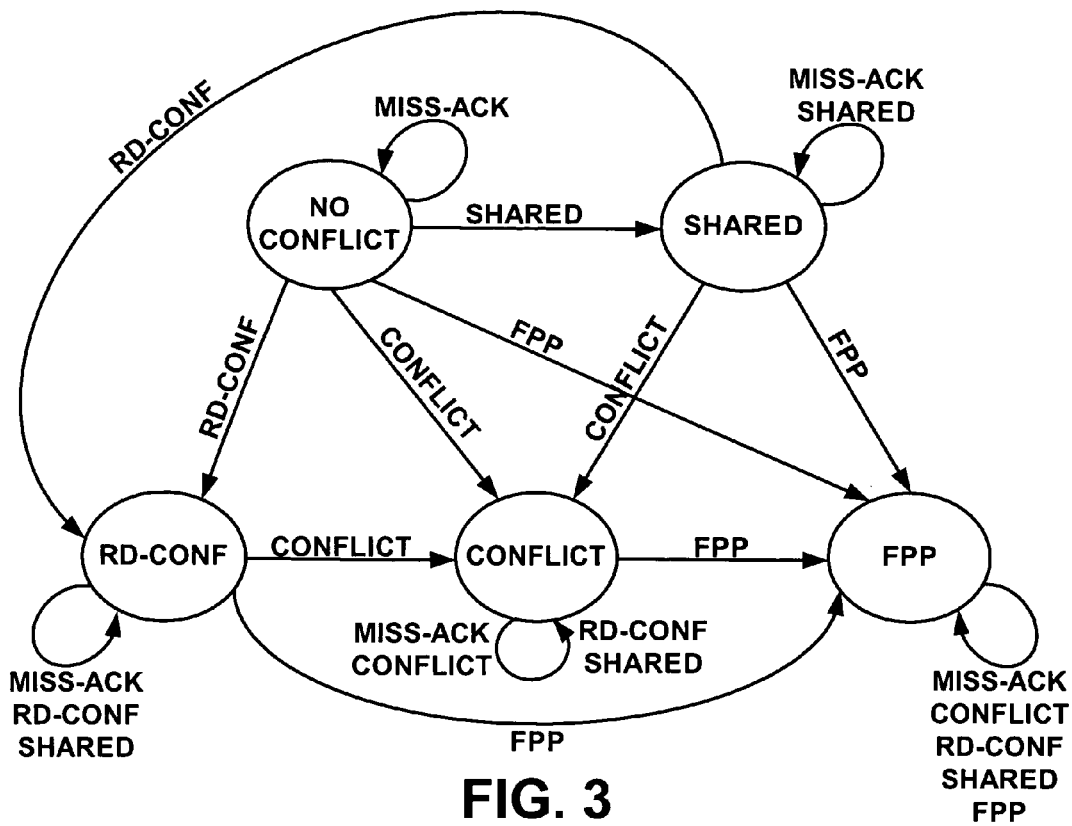
FIG. 3 depicts an example of a conflict state flow diagram that may be implemented in a coherency protocol.

FIG. 3 depicts an example of a conflict state diagram that represents operation of a conflict state machine that can be utilized to manage non-data responses returned to a source node. The example conflict state diagram of FIG. 3 implements non-data responses set forth in Table 3. As shown in the conflict state diagram of FIG. 3, an FPP response has priority over the MISS, SHARED, RD-CONF, and CONFLICT responses. Thus, the FPP response can transition the cache state machine to the FPP state, regardless of the other responses received at the source node. The CONFLICT response takes priority over the MISS, SHARED, and RD-CONF responses and thus transitions the conflict state machine to the CONFLICT state. The RD-CONF response takes priority over the MISS and SHARED responses and thus transitions the conflict state machine to the RD-CONF state. The SHARED response takes priority over the MISS response and thus transitions the conflict state machine to the SHARED state. The MISS response does not transition the state of the conflict state machine. As shown in the diagram of FIG. 3, once the conflict state machine transitions to a given state, any subsequent lower priority responses will not result in a state transition.

In a conflict state machine (see, e.g., FIG. 3) associated with a MAF, the transition to the RD-CONF state may be triggered by receiving a RD-CONF response from a snooped target node. The RD-CONF transition may also be triggered by receiving an XREAD request from another node. In a conflict state machine associated with a MAF at the source node, the CONFLICT transition may be triggered by receiving a CONFLICT response from a snooped node. The CONFLICT transition may also be triggered by receiving an XRDINVAL, XUPGRADE, XINVAL, or XWRITE request from another node. The CONFLICT transition may further be triggered by receiving a SET-CONF message from the data state machine associated with the MAF, as described herein with respect to FIG. 2.

One type of conflict situation can occur when two or more processors each have an outstanding request for the same line of data and a MAF associated with their respective requests. The response issued by a responding target processor of the group of conflicting processors depends on the MAF state for the conflicting request of the responding target processor. A list of example target processor responses that may be issued in conflict cases according to the hybrid cache coherency protocol described herein is depicted below in Table 5.

TABLE 5

| Source Request Type | MAF State at Target | Next MAF State at Target | Response to Source |
|---|---|---|---|
| Any Broadcast Read or Write | Any FPP Request (Except Victim) | Unchanged | FPP |
|  | Any Victim: XINVAL XWRITE | Unchanged | CONFLICT |
|  | Broadcast Reads: XREADN XREAD + DSM ≠ D-DATA* XREADC RD-CONF | Per Conflict State Machine | RD-CONF |
|  | Broadcast Writes: XRDINVAL XUPGRADE N XREAD + DSM = D-DATA* CONFLICT | Per Conflict State Machine | CONFLICT |

*DSM = Data State Machine (See FIG. 2)

As shown in Table 5, if a target node has an outstanding MAF in any FPP request state except a victim request when the source broadcast read or write request is received, the target node issues an FPP response to the source node and the target node MAF state remains unchanged. If a target node has an outstanding MAF in a FPP victim request state when the source broadcast read or write request is received, the target node issues a CONFLICT response to the source node and the target node MAF state remains unchanged. Also, if a target node has an outstanding MAF in one of the broadcast read states set forth in Table 5 when the source broadcast read or write request is received, the target node issues a RD-CONF response to the source node and the target node MAF state transitions according to the conflict state machine (see, e.g., FIG. 3). Further, if a target node has an outstanding MAF in one of the broadcast write states set forth in Table 5 when the source broadcast read or write request is received, the target node issues a CONFLICT response to the source node and the target node MAF state transitions according to the conflict state machine.

After all target nodes have responded to a source broadcast read/write request issued by a source node, the action taken at the source node proceeds according to several factors. These factors include the type of source broadcast read/write request issued by the source node, the resulting state of the data state machine (see, e.g., FIG. 2), and the resulting state of the conflict state machine (see, e.g., FIG. 3).

Referring back to FIG. 1, the source processor 12 may transmit a source broadcast read snoop (XREAD, see, e.g., Table 2) to the other processor 14, to the memory 16, and to the other nodes 20 via the system interconnect 18. The other nodes in the system respond to the XREAD request by providing either a data response or a non-data response (see, e.g., Table 3), depending on factors such as the state of the respective nodes when the request is received and whether there is a conflict with the request, as described herein. The responses drive the data state machine and conflict state machine at the source processor 12 associated with the XREAD request, as described herein (see, e.g., FIGS. 2 and 3). After all responses to the XREAD request have returned from the nodes in the system 10, the resulting action taken at the source processor 12 is determined in accordance with the resulting data state/conflict state combinations, such as set forth below in Table 6.

TABLE 6

| Data State Machine | Conflict State Machine | Action Taken at Source Node |
|---|---|---|
| NO-DATA | Don't Care | Transition to FPP mode and reissue using FPP request. |
| Don't Care | FPP | Transition to FPP mode and reissue using FPP request. |
| S-DATA | NO-CONFLICT, SHARED, RD-CONF | Fill cache with S-DATA, transition cache line to S-state, and retire MAF. |
| S-DATA | CONFLICT | FILL-INVALID - Fill cache with S-DATA, transition cache line to I-state, and retire MAF. |
| D-DATA | Don't Care | Error - D-DATA not returned for XREADN. |
| M-DATA | NO-CONFLICT, SHARED | Fill cache with M-DATA, transition cache line to E-state, F-state, or S-state, and retire MAF. |
| M-DATA | RD-CONF | Fill cache with M-DATA, transition cache line to S-state, and retire MAF. |
| M-DATA | CONFLICT | Transition to FPP mode and reissue using FPP request. |

According to the hybrid cache coherency protocol described herein, an example sequence of events for an XREADN transaction is as follows:

1. Allocate an entry in a source node MAF.
2. Broadcast the XREADN commands to the home and all processors. Set the MAF entry to a SNOOPS_PENDING state.
3. Respond to snoop responses and third party snoops in accordance with the data state machine (see, e.g., FIG. 2) and conflict state machine (see, e.g., FIG. 3) associated with the MAF entry as well as processor snoop response Table 4.
4. After all snoop responses have returned from other nodes, take actions as determined in XREADN snoop resolution Table 6 based on the data state machine and conflict state machine associated with the MAF entry.

As shown in Table 6, the hybrid cache coherency protocol described herein provides an approach to remain deterministic in resolving XREADN broadcast snoop transactions. If the conflict state machine indicates FPP, the transaction is resolved using an FPP request. The FPP message helps ensure forward progress in ordering and servicing the class of "not first" requests. The FPP message also inhibits the classification of any requests as the "first-ordered" request until all requests that have previously been classified as "not first" have been serviced.

In non-conflict cases, the XREADN broadcast snoop request is determined to be the "first-ordered" request and completes in the SSP portion of the hybrid coherency protocol. In this non-conflict case, the SSP portion of the hybrid coherency protocol may provide a low latency resolution of the XREADN request.

In the case of a RD-CONF conflict state and an S-DATA data state combination, the transaction is resolved by filling the cache line with the S-DATA, transitioning the cache line to the S-state, and the retiring the MAF. In this case, the XREADN request is identified as "not first" since it did not receive a D-DATA response. Nevertheless, the conflict and data states associated with the transaction at the requesting processor indicate that the requesting processor has received valid data from the ordering point and that the ordering point has not been migrated. As a result, the data can safely be cached and the XREADN request can be retired at the requesting processor without resorting to the FPP.

In the case of a CONFLICT conflict state and an S-DATA data state combination, the transaction is resolved by filling the cache line with the S-DATA, transitioning the cache line to the I-state, and retiring the MAF. In this case, the XREADN request is not a "first-ordered" request. Nevertheless, the requesting processor can employ a "fill invalid" feature to correctly utilize a "snapshot" of the data provided by the S-DATA response without caching the data at the requesting processor. The requesting processor thus makes forward progress without resorting to the FPP.

In the case of a RD-CONF conflict state and an M-DATA data state combination, the transaction is resolved by filling the cache line with the M-DATA, transitioning the cache line to the S-state, and retiring the MAF. The XREADN request cannot be classified as a "first-ordered" request since the XREADN request received no D-DATA. In this example, the M-DATA response indicates that there is no cached ordering point and that the only conflicting requests are also read requests, such that the ordering point will not migrate. Thus, the data can safely be cached and the read request retired at the requesting processor without resorting to the FPP.

In the case of a CONFLICT conflict state and an M-DATA data state combination, the SSP can only determine that the XREADN request is "not first." In this example, the hybrid coherency protocol transitions to the FPP mode and the request is reissued using an FPP request, which helps ensure resolution of the transaction. The hybrid cache coherency protocol described herein thus remains deterministic in providing a resolution of the XREADN broadcast snoop transaction by employing the SSP or, if the SSP cannot provide a deterministic resolution, by employing the FPP.

The source processor 12 may also transmit a source broadcast read snoop (XREAD, see, e.g., Table 2) to the other processor 14, to the memory 16, and to the other nodes 20 via the system interconnect 18. The other nodes in the system respond to the XREAD request by providing either a data response or a non-data response (see, e.g., Table 3), depending on factors such as the state of the respective nodes when the request is received and whether there is a conflict with the request, as described herein. The responses drive the data state machine and conflict state machine associated with the XREAD request, as described herein. After all responses to the XREAD request have returned from the nodes in the system 10, the resulting action taken at the source processor 12 is determined in accordance with the resulting data state/conflict state combinations, such as set forth below in Table 7.

TABLE 7

| Data State Machine | Conflict State Machine | Action Taken at Source Node |
|---|---|---|
| NO-DATA | Don't Care | Transition to FPP mode and reissue using FPP request. |
| S-DATA | FPP | Transition to FPP mode and reissue using FPP request. |
| S-DATA | NO-CONFLICT, SHARED, RD-CONF | Fill cache with S-DATA, transition cache line to S-state, and retire MAF. |

TABLE 7-continued

| Data State Machine | Conflict State Machine | Action Taken at Source Node |
|---|---|---|
| S-DATA | CONFLICT | FILL-INVALID - Fill cache with S-DATA, transition cache line to I-state, and retire MAF. |
| D-DATA | NO-CONFLICT | Fill cache with D-DATA, transition cache line to D-state, and issue MACK. |
| D-DATA | SHARED | Fill cache with D-DATA, transition cache line to D-state, and issue MACK. |
| D-DATA | RD-CONF, CONFLICT | Fill cache with D-DATA, transition cache line to D-state, transition to migratory mode and issue XINVAL. Issue MACK/MACK-ACK sequence when XINVAL acknowledged. |
| D-DATA | FPP | Fill cache with D-DATA, transition cache line to O-state, transition to migratory mode and issue XINVAL. Issue MACK when XINVAL acknowledged. Transition to FPP and reissue using FPP request upon MACK-ACK. |
| M-DATA | NO-CONFLICT, SHARED | Fill cache with M-DATA, transition cache line to F-state or S-state, and retire MAF. |
| M-DATA | RD-CONF | Fill cache with M-DATA, transition cache line to S-state, and retire MAF. |
| M-DATA | CONFLICT, FPP | Transition to FPP mode and reissue using FPP request. |

According to the hybrid cache coherency protocol described herein, an example sequence of events for an XREAD transaction is as follows:

1. Allocate an entry in a source node MAF.
2. Broadcast the XREAD commands to the home and all processors. Set the MAF entry to a SNOOPS_PENDING state.
3. Respond to snoop responses and third party snoops in accordance with the data state machine (see, e.g., FIG. 2) and conflict state machine (see, e.g., FIG. 3) associated with the MAF entry as well as processor snoop response Table 4.
4. After all snoop responses have returned from other nodes, take actions as determined in XREAD snoop resolution Table 7 based on the data state machine and conflict state machine associated with the MAF entry.
5. If XREAD snoop resolution Table 7 indicates a transition to "migratory mode," broadcast XINVAL commands to all processors.
6. Respond to third party snoops in accordance with the "Broadcast Writes" target MAF state entry of processor snoop response for conflict cases Table 5.
7. After all XINVAL responses have returned, initiate an MACK/MACK-ACK sequence.

As shown in Table 7, the hybrid cache coherency protocol described herein provides an approach to remaining deterministic in resolving XREAD broadcast snoop transactions. In the case of a RD-CONF or CONFLICT conflict state and a D-DATA data state combination, the transaction is resolved by migrating the data, i.e., filling the cache line with the D-DATA, transitioning the cache line to the D-state, broadcasting XINVAL requests, and initiating a MACK/MACK-ACK sequence. In this case, the XREAD request is the "first-ordered" request and, thus, the ordering point is migrated, the XREAD request is completed, and the MAF is retired in the SSP mode.

In the case of a CONFLICT conflict state and an M-DATA data state combination, the XREAD request is identified as "not first" and the XREAD request transaction cannot be resolved in the SSP mode. In this case, the hybrid coherency protocol transitions to the FPP mode and the request is reissued using an FPP request, which allows the request to make forward progress.

In non-conflict cases, the XREAD broadcast snoop request is determined to be the "first-ordered" request and completes in the SSP portion of the hybrid coherency protocol. In this non-conflict example, the SSP portion of the hybrid coherency protocol affords a low latency resolution of the XREAD request.

If the data state machine indicates S-DATA or M-DATA and the conflict state machine indicates FPP, the transaction is resolved by reissuing the request as an FPP request. In this case, the FPP conflict message allows the hybrid coherency protocol to help ensure forward progress of other requests that are already executing under the FPP. The FPP conflict inhibits the classification of any subsequent requests as a "first-ordered" request until after the XREAD request classified as "not first" has been serviced.

If the data state machine indicates D-DATA and the cache state machine indicates FPP, the transaction is resolved by migrating the data, e.g., filling the cache line with the D-DATA, transitioning the cache line to the O-state, broadcasting XINVAL requests, and initiating a MACK/MACK-ACK sequence. In this case, the D-DATA data state machine classifies the XREAD request as the "first-ordered" request, so the hybrid coherency protocol permits the XREAD request to migrate the ordering point while disallowing forward progress so that other transactions that are already executing in the FPP can make forward progress.

In the case of a RD-CONF conflict state and an S-DATA data state combination, the transaction is resolved by filling the cache line with the S-DATA, transitioning the cache line to the S-state, and retiring the MAF. In this case, the XREAD is identified as "not first" since the XREAD request did not receive a D-DATA response. The RD-CONF conflict state and S-DATA data state indicate that the requesting processor has received valid data from the ordering point and that the ordering point has not been migrated. Thus, the data can safely be cached and the XREAD request retired without resorting to the FPP.

In the case of a CONFLICT conflict state and an S-DATA data state combination, the transaction is resolved by filling the cache line with the S-DATA, transitioning the cache line to the I-state, and retiring the MAF. In this case, the XREAD request is not a "first-ordered" request. Nevertheless, the requesting node can correctly use a "fill invalid" snapshot of the data provided by the S-DATA, as long as the requesting node does not cache the data. This allows the XREAD to make forward progress without resorting to the FPP.

In the case of a RD-CONF conflict state and an M-DATA data state combination, the transaction is resolved by filling the cache line with the M-DATA, transitioning the cache line to the S-state, and retiring the MAF. In this case, the XREAD request cannot be classified as the "first-ordered" request because D-DATA was not received. The M-DATA data state indicates that there is no cached ordering point and the RD-CONF conflict state indicates that the only conflicting requests are also reads, which will not migrate the ordering point. Thus, the hybrid coherency protocol can cache the data safely in the SSP mode and the XREAD MAF can be retired without resorting to the FPP. The hybrid cache coherency protocol described herein thus remains deterministic in providing a resolution of XREAD broadcast snoop transactions by employing an SSP or, if the SSP cannot provide a deterministic resolution, by employing the FPP.

The source processor 12 may also transmit a source broadcast read current snoop (XREADC, see, e.g., Table 2) to the other processor 14, to the memory 16, and to the other nodes 20 via the system interconnect 18. The other nodes in the system 10 respond to the XREADC request by providing either a data response or a non-data response (see, e.g., Table 3), depending on factors such as the state of the respective nodes when the request is received and whether there is a conflict with the request, as described herein. The responses drive the data state machine and conflict state machine at the source processor 12 associated with the XREADC request, as described herein. After all responses to the XREADC request have returned from the nodes in the system 10, the resulting action taken at the source processor 12 is determined in accordance with the resulting data state/conflict state combinations, as set forth below in Table 8.

TABLE 8

| Data State Machine | Conflict State Machine | Action Taken at Source Node |
| --- | --- | --- |
| NO-DATA | Don't Care | Transition to FPP mode and reissue using FPP request. |
| S-DATA | FPP | Transition to FPP mode and reissue using FPP request. |
| S-DATA | NO-CONFLICT, SHARED, RD-CONF, CONFLICT | FILL-INVALID - Fill cache with S-DATA, transition cache line to I-state, and retire MAF. |
| D-DATA | Don't Care | Error - D-DATA not returned for XREADC. |
| M-DATA | NO-CONFLICT, SHARED, RD-CONF | FILL-INVALID - Fill cache with M-DATA, transition cache line to I-state, and retire MAF. |
| M-DATA | CONFLICT, FPP | Transition to FPP mode and reissue using FPP request. |

According to the hybrid cache coherency protocol described herein, an example sequence of events for an XREADC transaction is as follows:
1. Allocate an entry in a source node MAF.
2. Broadcast the XREADC commands to the home and all processors. Set the MAF entry to a SNOOPS_PENDING state.
3. Respond to snoop responses and third party snoops in accordance with the data state machine (see, e.g., FIG. 2) and conflict state machine (see, e.g., FIG. 3) associated with the MAF entry as well as processor snoop response Table 4.
4. After all snoop responses have returned from other nodes, take actions as determined in XREADC snoop resolution Table 8 based on the data state machine and conflict state machine associated with the MAF entry.

As shown in Table 8, the hybrid cache coherency protocol described herein provides an approach to remain deterministic in resolving XREADC broadcast snoop requests. In non-conflict cases, the XREADC broadcast snoop request is determined to be the "first-ordered" request and thus completes in the SSP portion of the hybrid coherency protocol. In this non-conflict case, the SSP portion of the hybrid coherency protocol provides a deterministic resolution of the XREADC request.

If the conflict state machine indicates FPP, the transaction is resolved by reissuing the request as an FPP request. In this FPP conflict example, the FPP conflict message allows the hybrid coherency protocol to ensure forward progress of other requests that are already executing under the FPP. The FPP conflict inhibits the classification of any subsequent requests as "first-ordered" until after the XREADC request classified as "not first" has been serviced.

In non-conflict cases, the XREADC broadcast snoop request is determined to be "first-ordered" and completes in the SSP portion of the hybrid coherency protocol. In this non-conflict case, the SSP portion of the hybrid coherency protocol affords low latency resolution of the XREADC request.

In the case of a RD-CONF or CONFLICT conflict state and an S-DATA data state combination, the transaction is resolved by filling the cache line with the S-DATA, transitioning the cache line to the I-state, and retiring the MAF. In this case, the XREADC request is not a "first-ordered" request. Nevertheless, the fill-invalid feature described herein enables the requesting node to correctly utilize the data provided by the S-DATA response without caching the data. As a result, the XREADC can make forward progress without resorting to the FPP and without caching the data. If the requesting processor requires further use of the data, however, a new request will be required.

In the case of a RD-CONF conflict state and an M-DATA data state combination, the transaction is resolved deterministically by filling the cache line with the M-DATA, transitioning the cache line to the I-state, and retiring the MAF. In this case, the XREAD request cannot be classified as "first-ordered" because D-DATA was not received. The M-DATA data state indicates that there is no cached ordering point and the RD-CONF conflict state indicates that the only conflicting requests are also reads. In this case, the XREADC request is not a "first-ordered" request. Nevertheless, the requesting node can correctly employ the fill invalid feature to provide a single use (e.g., a snapshot) of the data provided by the M-DATA without caching the data. The fill-invalid feature thus allows the XREADC to make forward progress without resorting to the FPP in a read-conflict situation when M-data is received.

In the case of a CONFLICT conflict state and an M-DATA data state combination, the XREADC request is identified as "not first" such that the XREADC request transaction cannot be resolved in the SSP mode. In this case, the hybrid coherency protocol transitions to the FPP mode and the request is reissued using an FPP request, which allows the request to make forward progress. The hybrid cache coherency protocol described herein thus remains deterministic in providing a resolution of XREADC broadcast snoop transactions by employing an SSP or, if the SSP cannot provide a deterministic resolution, by employing the FPP.

The source processor 12 may also transmit a source broadcast read and invalidate line with owner snoop (XRDINVAL, see, e.g., Table 2) to the other processor 14, to the memory 16, and to the other nodes 20 via the system interconnect 18. The other nodes in the system respond to the XRDINVAL request by providing either a data response or a non-data response (see, e.g., Table 3), depending on factors such as the state of the respective nodes when the request is received and whether there is a conflict with the request, as described herein. The responses drive the data state machine and conflict state machine associated with the XRDINVAL request, as described herein. After all responses to the XRDINVAL request have returned from the nodes in the system 10, the resulting action taken at the source processor 12 is determined in accordance with the resulting data state/conflict state combinations, as set forth below in Table 9.

TABLE 9

| Data State Machine | Conflict State Machine | Action Taken at Source Node |
| --- | --- | --- |
| NO-DATA | Don't Care | Transition to FPP mode and reissue using FPP request. |
| S-DATA | Don't Care | Error - S-DATA not returned for XRDINVAL. |
| Don't Care | SHARED | Error - XRDINVAL should return MISS response. |

TABLE 9-continued

| Data State Machine | Conflict State Machine | Action Taken at Source Node |
| --- | --- | --- |
| D-DATA | NO-CONFLICT, RD-CONF, CONFLICT | Fill cache with D-DATA, transition cache line to D-state, and issue MACK. |
| D-DATA | FPP | Fill cache with D-DATA, transition cache line to O-state, and issue MACK. |
| M-DATA | NO-CONFLICT, RD-CONF | Fill cache with M-DATA, transition cache line to E-state, and retire MAF. |
| M-DATA | CONFLICT, FPP | Transition to FPP mode and reissue using FPP request. |

According to the hybrid cache coherency protocol described herein, an example sequence of events for an XRDINVAL transaction are as follows:
1. Allocate an entry in a source node MAF.
2. Broadcast the XRDINVAL commands to the home and all processors. Set the MAF entry to a SNOOPS_PENDING state.
3. Respond to snoop responses and third party snoops in accordance with the data state machine (see, e.g., FIG. 2) and conflict state machine (see, e.g., FIG. 3) associated with the MAF entry as well as processor snoop response Table 4.
4. When all snoop responses have returned from other nodes, take actions as determined in XRDINVAL snoop resolution Table 9 based on the data state machine and conflict state machine associated with the MAF entry.
5. If the XRDINVAL snoop resolution Table 9 indicates an "Issue MACK" action, initiate MACK/MACK-ACK sequence.

As shown in Table 9, the hybrid cache coherency protocol described herein provides an approach to remain deterministic in resolving XRDINVAL broadcast snoop requests. If the conflict state machine indicates FPP, the transaction is resolved by reissuing the request as an FPP request. In this FPP conflict situation, the FPP conflict message allows the hybrid coherency protocol to ensure forward progress of other requests that are already executing under the FPP. The FPP conflict inhibits the classification of any subsequent requests as "first-ordered" until the XRDINVAL request classified as "not first" has been serviced.

In non-conflict cases, the XRDINVAL broadcast snoop request is determined to be "first-ordered" and completes in the SSP portion of the hybrid coherency protocol. In this non-conflict example, the SSP portion of the hybrid coherency protocol provides a low latency resolution of the XRDINVAL request.

In the case of a D-DATA data state without a non-FPP conflict state, the transaction is resolved by migrating the data, e.g., filling the cache line with the D-DATA, transitioning the cache line to the D-state, and initiating a MACK/MACK-ACK sequence. In this example of migrating data, the XRDINVAL request is classified as the "first-ordered" request. As a result, the ordering point is migrated, the XRDINVAL request is completed, and the MAF is retired to resolve the transaction in the SSP mode of the hybrid protocol.

In the case of a RD-CONF or CONFLICT conflict state and an S-DATA data state combination, the transaction is resolved by filling the cache line is filled with the S-DATA, transitioning the cache line to the I-state, and retiring the MAF. In this case, the XRDINVAL request is not a "first-ordered" request. Nevertheless, the requesting node can correctly use a fill invalid feature to make a single use of the data provided by the S-DATA without caching the data. The fill-invalid feature thus allows the XRDINVAL to make forward progress (for a single use of the data) without resorting to the FPP. However, additional use of the data will require another request to be initiated in the SSP mode of the hybrid protocol.

In the case of a RD-CONF conflict state and an M-DATA data state combination, the transaction is resolved by filling the cache line with the M-DATA, transitioning the cache line to the I-state, and retiring the MAF. In this conflict example, the XRDINVAL request cannot be classified as a "first-ordered" request because D-DATA was not received. The M-DATA data state indicates that there is no cached ordering point and the RD-CONF conflict state indicates that the only conflicting requests are also read requests. Consequently, the XRDINVAL request is not classified as a "first-ordered" request. Nevertheless, the requesting node can utilize the fill invalid feature to obtain a single use of the data provided by the M-DATA without caching the data. The fill-invalid feature thus allows the XRDINVAL to make forward progress without resorting to the FPP mode of the hybrid protocol.

In the case of a CONFLICT conflict state and an M-DATA data state combination, the XRDINVAL request is identified as "not first" and the XRDINVAL request transaction cannot be resolved in the SSP mode. In this case, the hybrid coherency protocol transitions to the FPP mode and the request is reissued using an FPP request, which allows the request to make forward progress according to procedures implemented by the FPP. The hybrid cache coherency protocol described herein thus remains deterministic in providing a resolution of XRDINVAL broadcast snoop transactions by employing an SSP or, if the SSP cannot provide a deterministic resolution, by employing the FPP.

The source processor 12 may also transmit a source broadcast upgrade/invalidate line snoop (XUPGRADE, see, e.g., Table 2) to the other processor 14, to the memory 16, and to the other nodes 20 via the system interconnect 18. The other nodes in the system respond to the XUPGRADE request by providing a non-data response (see, e.g., Table 3), depending on factors such as the state of the respective nodes when the request is received and whether there is a conflict with the request, as described herein. The responses drive the data state machine and conflict state machine associated with the XUPGRADE request, as described herein. After all responses to the XUPGRADE request have returned from the nodes in the system 10, the resulting action taken at the source processor 12 is determined in accordance with the resulting data state/conflict state combinations, such as set forth below in Table 10.

TABLE 10

| Data State Machine | Conflict State Machine | Action Taken at Source Node |
|---|---|---|
| NO-DATA | NO-CONFLICT, RD-CONF, CONFLICT | Transition cache line to D-state, and retire MAF. |
| NO-DATA | SHARED | Error - XUPGRADE should return MISS response. |
| NO-DATA | FPP | Transition to FPP mode and reissue using FPP request. |
| S-DATA, D-DATA | Don't Care | Error - Data is not returned for XUPGRADE (source node is owner). |
| M-DATA | Don't Care | Error - No message sent to memory for XUPGRADE. |

According to the hybrid cache coherency protocol described herein, an example sequence of events for an XUPGRADE transaction is as follows:
1. Allocate an entry in a source node MAF.
2. Broadcast the XUPGRADE commands to the home and all processors. Set the MAF entry to a SNOOPS_PENDING state.
3. Respond to snoop responses and third party snoops in accordance with the data state machine (see, e.g., FIG. 2) and conflict state machine (see, e.g., FIG. 3) associated with the MAF entry as well as processor snoop response Table 4.
4. After all snoop responses have returned from other nodes, take actions as determined in XUPGRADE snoop resolution Table 10 based on the data state machine and conflict state machine associated with the MAF entry.

As shown in Table 10, the hybrid cache coherency protocol described herein provides an approach to remain deterministic in resolving XUPGRADE broadcast snoop transactions. Since, by definition, XUPGRADE requests do not expect data responses, the data state is only used to indicate an erroneous transaction. In all other cases, the resolution of the XUPGRADE transaction is determined based on the conflict state. It should be recognized that the XUPGRADE request is sourced only by nodes in the O or F states (XUPGRADE requests to cache lines in the S state must be issued in FPP). Thus, since the node issuing the XUPGRADE request is an ordering point, by definition, the issuing node may order itself "first". Thus, the only case in which an XUPGRADE request may transition to FPP is where the cache state machine is in the FPP state.

By way of further example, with reference to FIG. 1, assume that the processor 12 (a source node) requires a copy of data associated with a particular memory address, and assume that the data is unavailable from its own local cache 22. Since the processor 12 does not contain a copy of the requested data, the cache line of the processor may be initially in the I-state (invalid) for that data or it may contain different data altogether. For purposes of simplicity of explanation, the starting state of the source node cache line for this example is the I-state. The processor 12, operating as the source node, transmits a source broadcast read snoop (XREAD) to the other processor 14, to the memory 16, and to the other nodes 20 via the system interconnect 18.

In this example, it is assumed that, at the time of the XREAD request, processor 14 is an owner node, i.e., a cache ordering point for the data. For this example, assume that the owner node 14 has a copy of the data in an M-state cache line of the owner node. In response to receiving the XREAD request broadcast from the source processor 12, the memory 16 will return an M-DATA response and the owner node 14 will return a D-DATA response (see, e.g., Table 3). Referring to the data state diagram of FIG. 2, the D-DATA response from the owner node 14 has priority over the M-DATA response from memory 16. As a result, after all responses have been received from the nodes of the system 10, the data state machine associated with the XREAD request of the source processor 12 is in the D-DATA state. Referring to the conflict state diagram of FIG. 3, the source processor 12, having received no conflict messages, places the conflict state machine associated with the XREAD request in the NO_CONFLICT state. After all responses to the XREAD request have returned from the nodes in the system 10, the resulting action taken at the source processor 12 is determined in accordance with XREAD snoop resolution Table 7.

Referring to Table 7, since the data state machine is in the D-DATA state and there are no conflicts, the resulting action taken at the source node 12 is to migrate the data to the source node 12, filling the source node cache with the D-DATA, transition the source node cache line associated with the data to the D-state. A MACK/MACK-ACK sequence also is initiated to complete the migration. Thus, in this example, the XREAD request is identified as the "first-ordered" request. Thus, the ordering point is migrated, the XREAD request is completed, and the MAF is retired to resolve the transaction in the SSP mode.

The above example illustrates a conflict scenario that leads to one of the data state/conflict state combinations of Table 7. It will be appreciated that the other data state/conflict state combinations of Table 7 would similarly result in the corresponding source node actions illustrated in Table 7. It will also be appreciated that the various data state and conflict state combinations of Table 7 may arise in a great number of circumstances involving an XREAD request with conflict and non-conflict scenarios. The hybrid cache coherency protocol described herein remain deterministic in resolving the XREAD transaction in these conflict and non-conflict scenarios, as described above in the discussion associated with Table 7.

Figure 4:
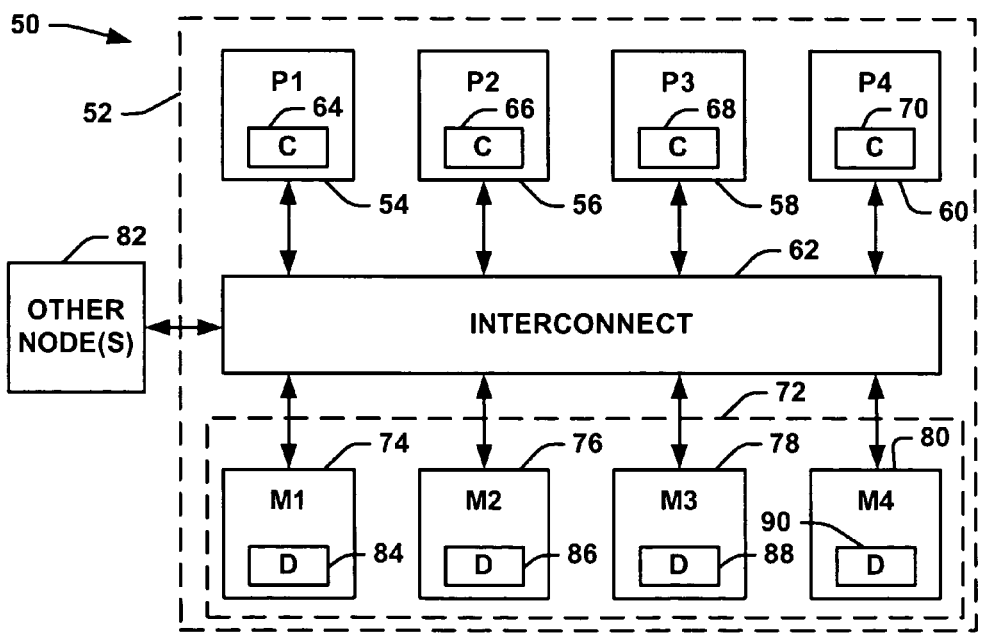
FIG. 4 depicts an example of another multi-processor system.

FIG. 4 depicts an example of a multi-processor computing system 50. The system 50, for example, includes an SMP (symmetric multi-processor) node 52 that includes processors (P1, P2, P3, P4) 54, 56, 58 and 60 in communication with each other via an interconnect 62. The interconnect 62 facilitates transferring data between processors and memory of the system 50. While four processors 54, 56, 58, and 60 are depicted in the example of FIG. 2, those skilled in the art will appreciate that a greater or smaller number of processors can be implemented in the node 52.

Each processor 54, 56, 58, and 60 also includes an associated cache 64, 66, 68 and 70. The caches 64, 66, 68, and 70 can enable faster access to data than from an associated main memory 72 of the processor 52. The system 50 implements a hybrid cache coherency protocol designed to guarantee coherency of data in the system. By way of example, the hybrid cache coherency protocol can be implemented to include a source broadcast protocol in which broadcast snoops or requests for data are transmitted directly from a source processor to all other processors and memory in the system 50. The source broadcast protocol can further be implemented in conjunction with another forward progress protocol, such as a null-directory or other directory-based protocol. The system 50 of FIG. 2, for example, employs the source broadcast protocol to process a request for data. If the request cannot be processed using the source broadcast protocol, such as where a conflict exists, the system 50 transfers to its forward progress protocol.

The memory 72 can include multiple memory modules (M1, M2, M3, M4) 74, 76, 78 and 80. For example, the memory 72 can be organized as a single address space that is shared by the processors 54, 56, 58 and 60 as well as other nodes 82 of the system 50. Each of the memory modules 74, 76, 78 and 80 can include a corresponding directory 84, 86, 88 and 90 that defines where the corresponding coherent copy of the data should reside in the system 50. Alternatively, the memory modules may contain no directories. A coherent copy of data, for example, may reside in a home node (e.g., associated with a given memory module) or, alternatively, in a cache of one of the processors 54, 56, 58 and 60.

The other node(s) 82 can include one or more other SMP nodes associated with the SMP node 52 via the interconnect 62. For example, the interconnect 62 can be implemented as a switch fabric or hierarchical switch programmed and/or configured to manage transferring requests and responses between the processors 54, 56, 58, and 60 and the memory 70, as well as those to and from the other nodes 82.

When a processor 56 requires desired data, the processor 56 operates as a source and issues a source broadcast snoop (e.g., a broadcast read or broadcast write request) to the system 50, including all other processors 54, 58 and 60 as well as to memory 72, via the interconnect 62. The hybrid cache coherency protocol described herein is designed to ensure that a correct copy of the data is returned in response to the source broadcast snoop.

By way of example, assume that the processor 54 (a source processor) requires a copy of data associated with a particular memory address, and assume that the data is unavailable from its own local cache 64. Since the processor 54 does not contain a copy of the requested data, the cache line of the processor may be initially in the I-state (invalid) for that data or it may contain different data altogether. For purposes of simplicity of explanation, the starting state of the source node cache line for this example is the I-state. The processor 54, operating as the source node, transmits a source broadcast read snoop (XREAD) to the other processors 56, 58, and 60, to the memory 72, and to the other nodes 82 via the interconnect 62.

In this example, it is assumed that, at the time of the XREAD request, at least one other processor (e.g., processor 56) in the system 10 has an outstanding FPP mode request for the same data. In response to receiving the XREAD request broadcast from the source processor 54, the memory will return an M-DATA response and target node 56 may return an FPP response (see, e.g., Table 5).

Referring to the data state diagram of FIG. 2, the M-DATA response from memory 72 places the data state machine associated with the XREAD request of the source processor 54 is in the M-DATA state. Referring to the conflict state diagram of FIG. 3, the FPP response from the target processor 56 places the conflict state machine associated with the XREAD request of the source processor 54 in the FPP conflict state. After all responses to the XREAD request have returned from the nodes in the system 50, the resulting action taken at the source processor 54 is determined in accordance with the XREAD snoop resolution Table 7, above.

As shown in Table 7, since the data state machine is in the M-DATA state and the conflict state machine is in the FPP state, the resulting action taken at the source node 54 is to reissue the request as an FPP request. In this conflict scenario, the FPP conflict message allows the hybrid coherency protocol to ensure forward progress of at least one other FPP request. The FPP conflict inhibits the classification of the XREAD requests as well as any subsequent requests as a "first-ordered" for the data until the XREAD request of the source node 54 has been serviced. The hybrid coherency protocol thus remains deterministic in resolving the XREAD request in the FPP conflict scenario described above.

Figure 5:
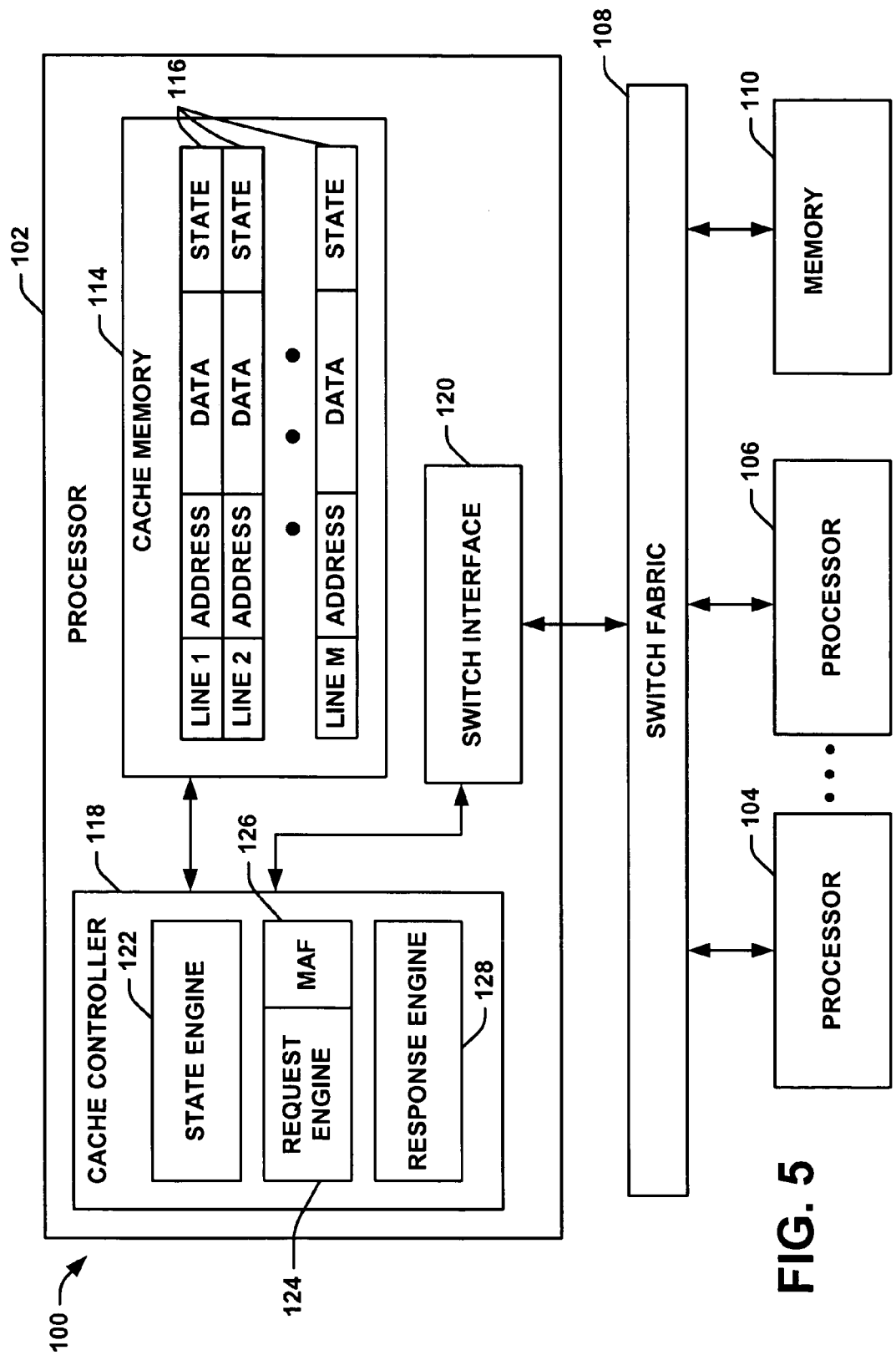
FIG. 5 depicts an example of a processor within a multiprocessor system.

FIG. 5 depicts an example of another multi-processor system 100 that includes a plurality of processors 102, 104 and 106 in communication with each other via a switch fabric 108. The system 100 also includes associated memory 110, which can be organized as a single address space that is shared by the processors 102, 104, and 106. For example, the memory 110 can be implemented as a plurality of separate memory modules associated with each of the respective processors 102, 104, and 106 for storing data. The system 100, for example, can be implemented as an integrated circuit or as circuitry containing plural integrated circuits.

The system 100 can employ a hybrid protocol that includes source broadcast or source-snoopy cache coherency protocol in combination with a forward progress protocol. For this type of protocol, a source processor 102, 104, and 106 can issue a source broadcast request to all other processors in the system and to the memory 110. In the event that a non deterministic conflict arises, the source processor can employ a forward progress protocol, such as a null-directory or other directory-based protocol, and reissue the request using such protocol.

In a null-directory-based protocol, for example, the memory 110 includes home nodes for each cache line. Instead of issuing a broadcast to all cache targets, the source issues a single request to the home node for such data. The home node thus operates as static ordering point for requested data since all requests are sent to the home node for ordering before snoops are broadcast. This tends to add an additional hop for the majority of references compared with a broadcast-based protocol described above. If the system employs a standard directory-based protocol, ordering is implemented at the home node, but the memory 110 employs associated directories that facilitate locating the data (e.g., based on the directory state associated with the requested data). In a standard directory protocol, there will be times when the directory can indicate that there are no cache copies, and thus the home node can respond with the data without issuing any snoops to the system 100.

The processor 102 includes cache memory 114 that contains a plurality of cache lines 116 (e.g., lines 1–M, where M is a positive integer, M≧1). Each cache line 116 can contain one or more memory blocks. A tag address (ADDRESS) is associated with the data contained in each cache line 116. Additionally, each cache line 116 can contain state information identifying the state of the data contained at that cache line. Examples of states that can be associated with each cache line 116 are identified above in Table 1.

A cache controller 118 is associated with the cache memory 114. The cache controller 118 controls and manages access to the cache memory, including requests for data and responses. The cache controller 118 communicates requests and responses via a switch interface 120 that is coupled with the switch fabric 108. The switch interface 120, for example, includes an arrangement of queues (e.g., input and output queues) or other data structures that organize both requests and responses issued by the processor 102 as well as requests and responses for execution by the processor.

In the example of FIG. 5, the cache controller 118 includes a state engine 122 that controls the state of each respective line 116 in the cache memory 114. The state engine 122 is programmed and/or configured to implement state transitions for the cache lines 116 based on predefined rules established by the hybrid cache coherency protocol described herein. For example, the state engine 122 can modify the state of a given cache line 116 based on requests issued by the processor 102. Additionally, the state engine 122 can modify the state of a given cache line 116 based on responses received at the processor 102 for the given tag address, such as may be provided by another processor 104, 106 and/or the memory 110.

The cache controller 118 also includes a request engine 124 that sends requests to the system 100. The request engine 124 employs a miss address file (MAF) 126 that contains MAF entries for outstanding requests associated with some subset of the locations in the cache memory 114. The MAF can be implemented as a table, an array, a linked list or other data structure programmed to manage and track requests for each cache line. For example, when the processor 102 requires data associated with a given tag address for a given line 116, the request engine 124 creates a corresponding entry in the MAF 126. The MAF entry includes fields that identify, for example, the tag address of the data being requested, the type of request, and response information received from other nodes in response to the request. The request engine 124 thus employs the MAF 126 to manage requests issued by the processor 102 as well as responses to such requests. The request engine can employ a data state machine and conflict state machine (see, e.g., FIGS. 2 and 3) associated with each MAF entry for helping to manage a data state and a conflict state associated with each MAF entry.

The cache controller 118 also includes a response engine 128 that controls responses provided by the processor 102. The processor 102 provides responses to requests or snoops received via the switch interface 120 from another processor 104 and 106 or memory 110. The response engine 128, upon receiving a request from the system 100, cooperates with the state engine 122 and the MAF 126 to provide a corresponding response based on the type of request and the state of data contained in the cache memory 114. For example, if a MAF entry exists for a tag address identified in a request received from another processor or memory, the cache controller can implement appropriate conflict resolution defined by the coherency protocol. The response engine thus enables the cache controller to send an appropriate response to requesters in the system 100. A response to a request can also cause the state engine 122 to effect a state transition for an associated cache line 116.

By way of example, assume that the processor 102 requires data not contained locally in its cache memory 114. The request engine 124 will create a MAF entry in the MAF 126, corresponding to the type of request and the tag address associated with required data. In this example, assume that the processor 102 issues a broadcast read and invalidate line request (XRDINVAL, see, e.g., Table 2) and a corresponding entry in the MAF 126. Assume also that the processor 104 is an owner node for the data and includes the data in a D-state cache line. Assume further that the processor 106 has an outstanding XRDINVAL MAF for the same data. The cache controller 118 broadcasts a source snoop XRDINVAL request to the nodes of the system 100 via the switch interface 120 and switch fabric 108.

In response to receiving the XRDINVAL request from the source node 102, the memory 110 provides an M-DATA response. The owner node 104 provides a D-DATA response and transitions to the T-state in accordance with the data migration procedures of the hybrid cache coherency protocol (see, e.g., Table 4). The processor 106, having an outstanding XRDINVAL MAF for the data, responds to the XRDINVAL by providing a non-data CONFLICT response (see, e.g., Table 5).

Referring to the data state diagram of FIG. 2, the D-DATA response from the owner node 104 has priority over the M-DATA response from memory 110. As a result, after all responses have been received from the nodes of the system 100, the data state machine associated with the MAF entry for the XRDINVAL request of the source node 102 is in the D-DATA state. Referring to the conflict state diagram of FIG. 3, the CONFLICT response from the processor 106 causes the conflict state machine associated with the XRDINVAL request of the source processor 102 to transition to the CONFLICT state. After all responses to the XRDINVAL request have returned from the nodes in the system 100, the resulting action taken at the source processor 102 can be determined in accordance with the XRDINVAL snoop resolution Table 9.

As shown in Table 9, since the data state machine is in the D-DATA state and the conflict state machine is in the CON- FLICT state, the resulting action taken at the source node 102 is to fill the source node cache with the D-DATA and transition the source node cache line associated with the data to the D-state. Thereafter, the source node 102 issues an MACK to the node 104. In response to receiving an MACK-ACK response from the node 104, the node 104 retires the MAF and thus becomes the owner node for the data. In this case, the XRDINVAL request is the "first-ordered" request. As a result, the ordering point is migrated, the XRDINVAL request is completed, and the MAF is retired to resolve the transaction in the SSP mode. The hybrid cache coherency protocol described herein thus provides for a deterministic resolution of the XRDINVAL request using the SSP in the CONFLICT scenario described in the above example.

The above example illustrates but a single conflict scenario that leads to one of the data state/conflict state combinations of Table 9. It will be appreciated that the other data state/conflict state combinations of Table 9 can result in the corresponding source node actions illustrated in Table 9. It will also be appreciated that the various data state and conflict state combinations of Table 9 can result from a great number of XRDINVAL circumstances involving conflict and non-conflict scenarios. Regardless of the scenario under which these data state/conflict state combinations are achieved, the action taken at the XRDINVAL source node will be determined according to the data state/conflict state combination after all responses are received at the source node. The hybrid cache coherency protocol described herein provides for resolving the XRDINVAL request using the SSP in the above-described conflict and non-conflict scenarios. When a conflict is encountered that renders the SSP unable to resolve a broadcast snoop transaction, the source node transitions to the FPP mode to resolve the transaction. The hybrid coherency protocol thus remains deterministic for the XRDINVAL transaction.

The various examples of conflict scenarios depicted herein so far have been addressed from the perspective of only one of the conflicting processors in a given conflict scenario and considering the conditions at the other processor to be essentially mostly static. These examples have not addressed the fact that in a conflict scenario, the source node and target node designations are relative. To illustrate this point, consider two processors, A and B, each of which have an outstanding request for the same data and therefore conflict with each other. From the point of view of processor A, processor A is the source node and processor B is the target node. From the point of view of processor B, processor B is the source node and processor A is the target node. It will thus be appreciated that in conflict scenarios, conflicting requests are handled by the hybrid cache coherency protocol at both conflicting nodes in the manner described herein. It will also be appreciated that the manner in which the requests of the conflicting processors are handled can depend in large part on the timing of the creation and/or retirement of the respective MAF entries at the conflicting processors and the timing of the respective snoops/responses of the conflicting processors. In these conflict scenarios, the hybrid cache coherency protocol described herein deterministically resolves the broadcast snoop transactions for each of processors A and B.

In view of the foregoing structural and functional features described above, certain methods that can be implemented using a coherency protocol will be better appreciated with reference to FIGS. 6-10. FIGS. 6-9 depict various example timing diagrams illustrating transactions involving scenarios that can arise in a multi-processor system employing a hybrid cache coherency protocol as described herein. Each of the examples illustrates various interrelationships between the requests, responses and state transitions that can occur for a given memory tag address in different memory devices or caches during a transaction. In each of these examples, time flows in the direction of an arrow labeled "TIME." Those skilled in the art may appreciate various other conflict scenarios that can arise during transactions in a multi-processor system employing a hybrid cache coherency protocol as described herein.

Figure 6:
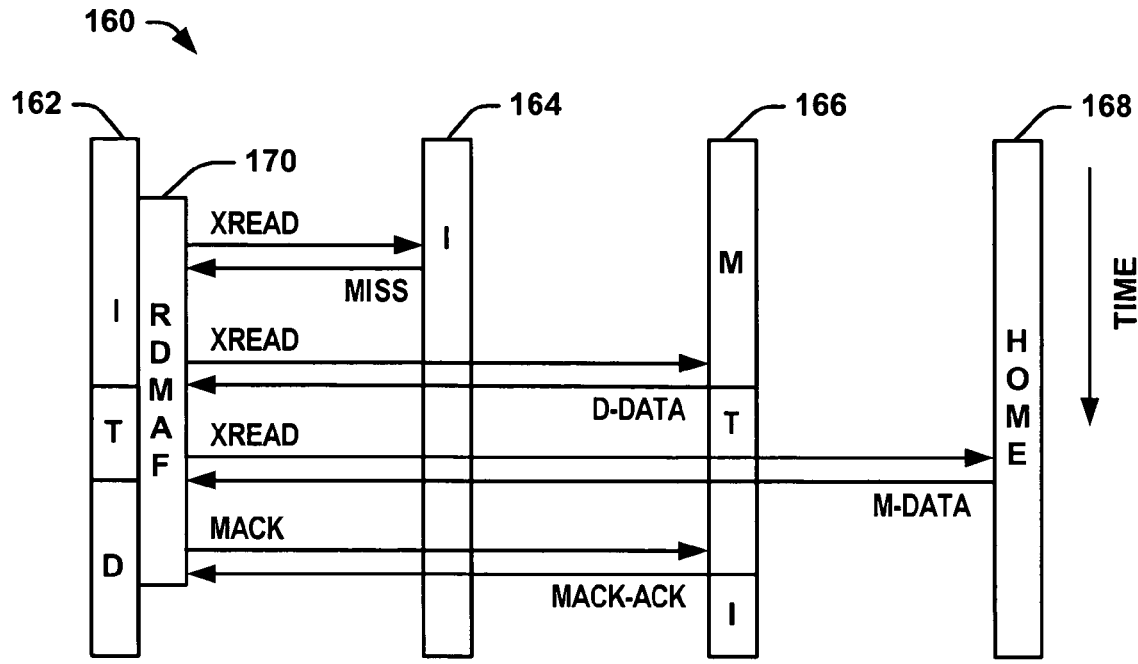
FIG. 6 depicts a first example conflict scenario illustrating state transitions for a coherency protocol.

FIG. 6 illustrates a network 160 that includes processor nodes 162, 164, and 166 and a home node 168. Initially, nodes 162 and 164 are in an I-state for a particular cache line. Node 166 is in the M-state for the cache line and thus is a cache ordering point for the data. Home node 168 contains a memory copy of the data associated with the cache line. In this example case, node 162 allocates a RDMAF entry 170 for the requested data and broadcasts an XREAD request to node 164, which, being in the I-state, returns a MISS response. Next, node 162 receives a D-DATA response to an XREAD request broadcast from node 162 to node 166 because node 166 is a cache ordering point for the data. Node 166 transitions to the T-state for the data. Next, node 162 receives an M-DATA response to an XREAD request broadcast from node 162 to home node 168.

At this point, responses have been received from all of the nodes to which node 162 broadcast the XREAD snoop request. Node 162, having received M-DATA and D-DATA, fills the cache at node 162 with the D-DATA because, according to the cache coherency protocol, D-DATA overrides M-DATA (see, e.g., Table 3). In this instance, the ordering point for the modified data at node 166 migrates to node 162. Node 162 transitions to the D-state and initiates a MACK/MACK-ACK sequence with node 166 to complete the migratory read transaction. In this case, the XREAD request is the "first-ordered" request and, thus, the ordering point is migrated, the XREAD request is completed, and the MAF is retired in the SSP mode.

Figure 7:
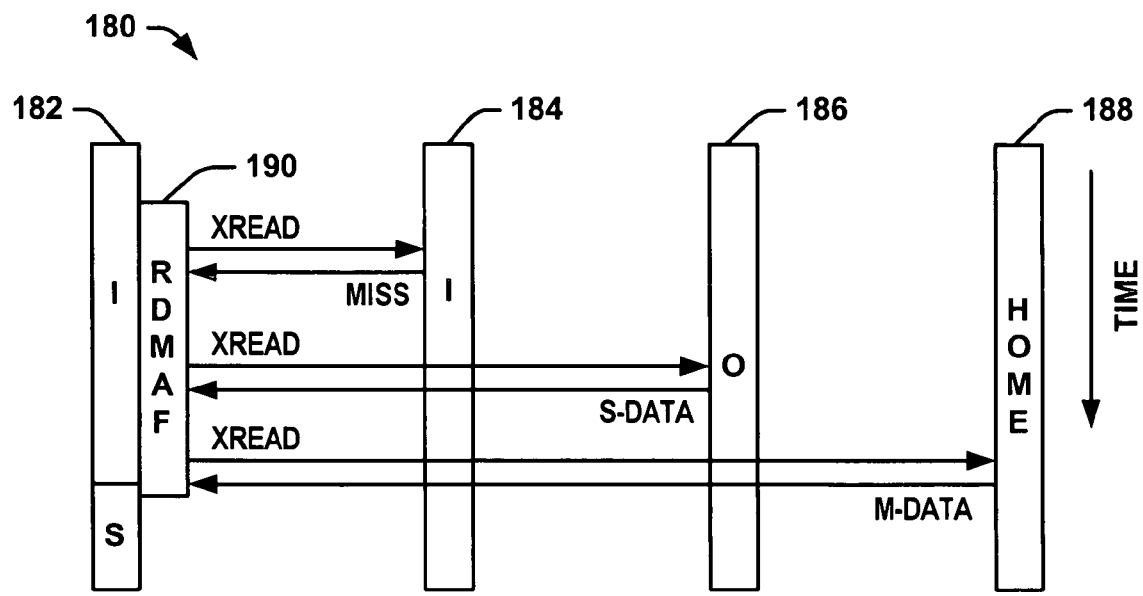
FIG. 7 depicts a second example conflict scenario illustrating state transitions for a coherency protocol.

FIG. 7 illustrates a network 180 that includes processor nodes 182, 184, and 186 and a home node 188. Initially, nodes 182 and 184 are in an I-state for a particular cache line. Home node 186 is in the O-state for the cache line and thus is a cache ordering point for the data. Node 188 contains a memory copy of the data associated with the cache line. In this example case, node 182 allocates a RDMAF entry 190 for the requested data and broadcasts an XREAD request to nodes 184, which, being in the I-state, each return a MISS response (see, e.g., Table 4). Next, node 182 receives an S-DATA response to an XREAD request broadcast from node 182 to node 186 because node 186 is a cache ordering point for the data. Node 186 remains in the O-state for the data. Next, node 182 receives an M-DATA response to an XREAD request broadcast from node 182 to home node 188.

At this point, responses have been received from all of the nodes to which node 182 broadcast the XREAD snoop request. Node 182, having received M-DATA and S-DATA, fills the cache at node 182 with the S-DATA because, according to the cache coherency protocol, S-DATA overrides M-DATA. Node 182 transitions to the S-state and becomes a sharer node for the data. In this case, the XREAD is identified as "not first" since the XREAD request did not receive a D-DATA response. Since there are no conflicts, source node 182 has received valid data from the ordering point (node 186) and that the ordering point has not been migrated. Thus, node 182 can safely cache the data and the XREAD request retired without resorting to the FPP. Node 186 remains the cache ordering point for the data and thus may respond to subsequent requests for the data in accordance with the cache coherency protocol as described herein.

Figure 8:
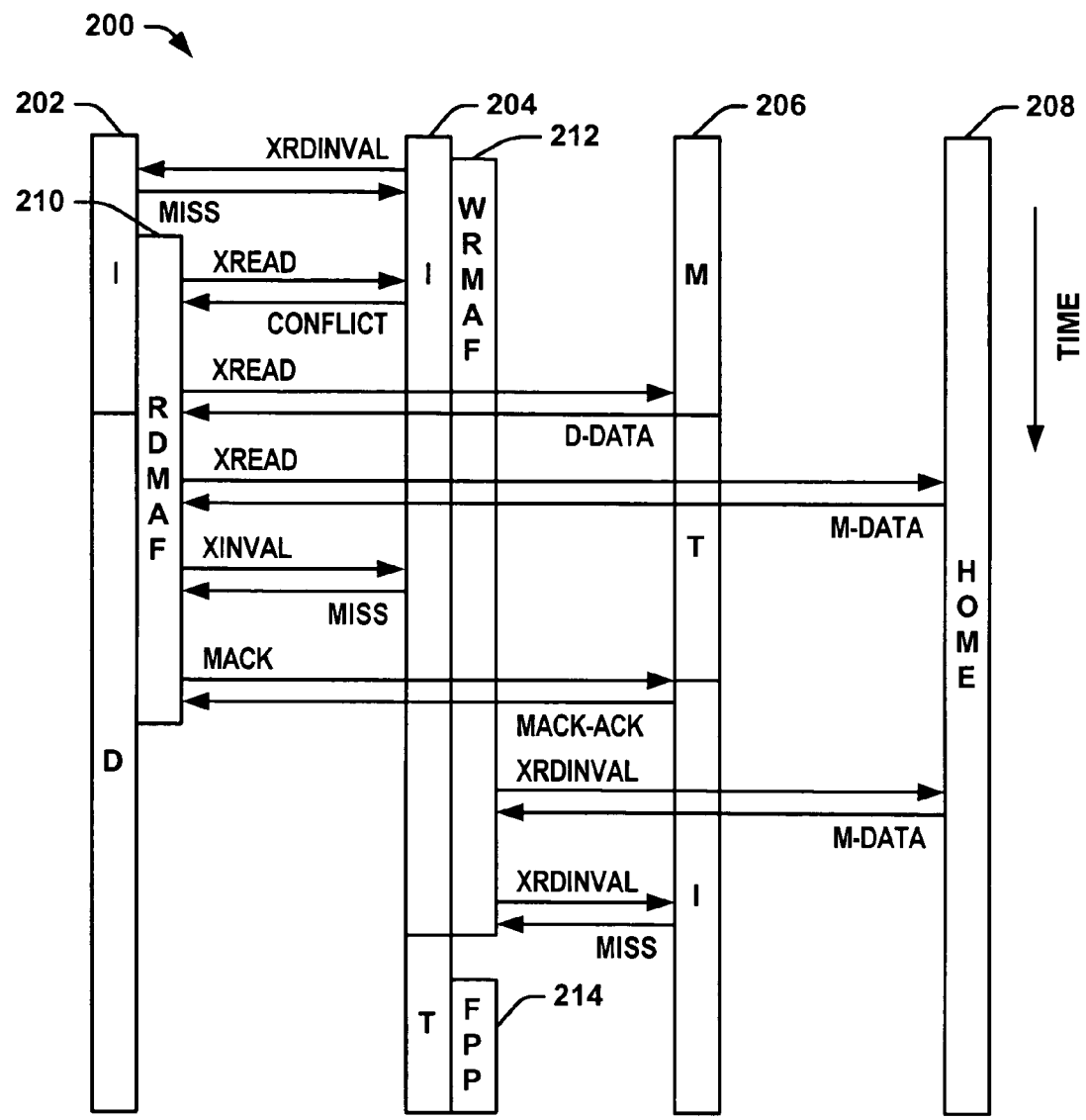
FIG. 8 depicts a third example conflict scenario illustrating state transitions for a coherency protocol.

FIG. 8 illustrates a network 200 that includes processor nodes 202, 204, and 206 and a home node 208. Initially, nodes 202 and 204 are in an I-state for a particular cache line and node 206 is an owner node in the M-state for the cache line. The home node 208 contains a memory copy of the data associated with the cache line. In this example case, node 204 allocates a WRMAF 212 and, thereafter, node 204 broadcasts an XRDINVAL to node 202, which returns a non-data MISS response. Next, node 202 allocates a RDMAF entry 210 for the requested data and broadcasts an XREAD request to node 204, which returns a CONFLICT response. Next, node 202 receives a D-DATA response to an XREAD request broadcast from node 202 to node 206. Node 206 transitions to the T-state upon providing the D-DATA response to node 202. Node 202 transitions to the D-state upon receiving the D-DATA response from node 206. Next, node 202 receives an M-DATA response to an XREAD request broadcast from node 202 to home node 208.

At this point, responses have been received from all of the nodes to which node 202 broadcast the XREAD snoop request. Referring to FIG. 2, the data state machine for the RDMAF 210 at node 202, having received the M-DATA response from the home node 208 and D-DATA from the owner node 206, transitions to the D-DATA state. Referring to FIG. 3, the conflict state machine for the RDMAF 210 at node 202, having received the CONFLICT response from node 204, transitions to the CONFLICT state. Referring to the XREAD snoop resolution Table 7, for the data state/conflict state combination of D-DATA and CONFLICT, the action taken at node 202 for the RDMAF 210 is to fill the cache line with the D-DATA and transition to the migratory mode. The node 202 broadcasts an XINVAL command to node 204, which returns a MISS response. When the MISS response from node 204 for the XINVAL is received, node 202 initiates an MACK/MACK-ACK sequence with the owner node 206 to complete the ordering point migration. The owner node 206 acknowledges the MACK from node 202 by providing an MACK-ACK response and transitioning to the I-state. When the MACK-ACK response is received from node 206, the migration is complete and the RDMAF 210 is retired, leaving node 202 in the D-state.

Thus, in this example, according to the hybrid cache coherency protocol described herein, the cache ordering point migrates from node 206 to node 202 in response to the XREAD request. In this case, the XREAD request is identified as the "first-ordered" request. Thus, the ordering point is migrated, the XREAD request is completed, and the MAF is retired in the SSP mode, even though there is a CONFLICT with WRMAF 212 at node 204. Thus, according to the hybrid cache coherency protocol described herein, in this conflict scenario, the XREAD transaction at node 202 is resolved in the SSP mode. The hybrid coherency protocol remains deterministic to resolve the transaction.

After node 202 has transitioned to the D-state, node 204 receives an M-DATA response to an XRDINVAL request broadcast from node 204 to home node 208. Node 204 then receives a MISS response to an XRDINVAL request broadcast from node 204 to node 206 because the XRDINVAL request finds node 206 in the I-state. At this point, responses have been received from all of the nodes to which node 204 broadcast snoop requests. Referring to FIG. 2, the data state machine for the WRMAF 212 at node 204, having received the M-DATA response from the home node 208 and MISS responses from nodes 202 and 206, transitions to the M-DATA state. Referring to FIG. 3, the conflict state machine for the WRMAF 212 at node 204, having received the XINVAL command from node 202, transitions to the CONFLICT state. Referring to Table 9, the data state/conflict state combination of M-DATA and CONFLICT indicates that the XRDINVAL request is identified as "not first" and the XRDINVAL request transaction cannot be resolved in the SSP mode. In this case, the hybrid coherency protocol transitions to the FPP mode and the request is reissued using an FPP request, which allows the request to make forward progress. The hybrid cache coherency protocol described herein thus remains deterministic for the transaction by employing the FPP to resolve the XRDINVAL request.

Figure 9:
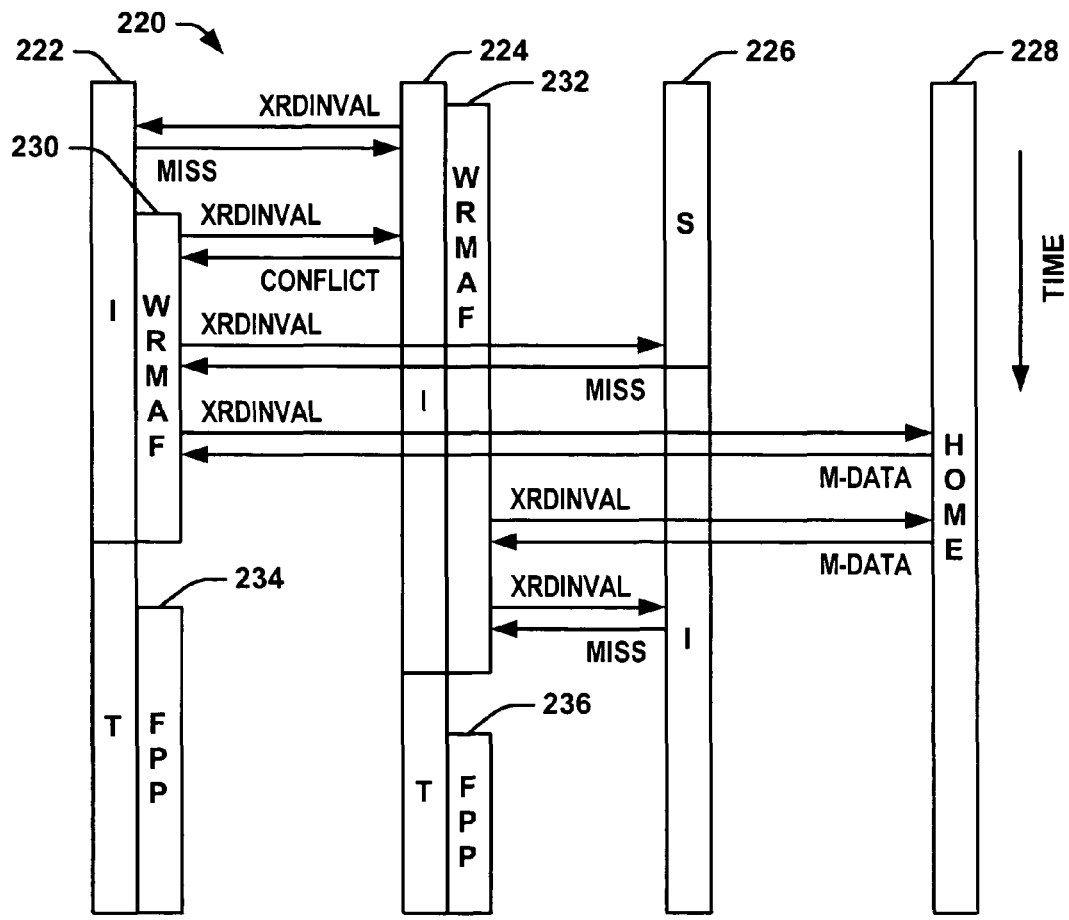
FIG. 9 depicts a fourth example conflict scenario illustrating state transitions for a coherency protocol.

FIG. 9 illustrates an example scenario in which a network 220 includes processor nodes 222, 224, and 226 and a home node 228. Initially, nodes 222 and 224 are in an I-state for a particular cache line and node 226 is in the S-state for the cache line. The home node 228 contains a memory copy of the data associated with the cache line. In this example case, node 224 allocates a write MAF entry (WRMAF) 232 and broadcasts a read and invalidate line with owner request (XRDINVAL) to node 222, which returns a MISS response indicating that the cache line is invalid at node 222. Next, node 222 allocates a WRMAF 230 and broadcasts an XRDINVAL request to node 224, which returns a CONFLICT response indicating that there is a write conflict with the outstanding MAF 232 at node 224. Next, node 222 receives a MISS response to an XRDINVAL request broadcast from node 222 to node 226. The cache line for the requested data at node 226 transitions to the I-state in response to the XRDINVAL request from node 222. Next, node 222 receives an M-DATA response to an XRDINVAL request broadcast from node 222 to home node 228.

At this point, responses have been received from all of the nodes to which node 222 broadcast snoop requests. Referring to FIG. 2, the data state machine for the MAF 230 at node 222, having received the M-DATA response from the home node 228 and no other data responses, transitions to the M-DATA state. Referring to FIG. 3, the conflict state machine for the MAF 230 at node 222, having received the CONFLICT response from node 224 and the MISS response from node 226, transitions to the CONFLICT state. Referring to the XRDINVAL snoop resolution Table 9, for the data state/ conflict state combination of M-DATA and CONFLICT, the action taken at the source node 222 for the XRDINVAL MAF 230 is to transition to the FPP mode and reissue the request using an FPP request, as indicated at 234.

After node 226 has transitioned to the I-state, node 224 receives an M-DATA response to an XRDINVAL request broadcast from node 224 to home node 228. Next, node 224 receives a MISS response to an XRDINVAL request broadcast from node 224 to node 226, node 226 having already been invalidated by the XRDINVAL request from node 222. At this point, responses have been received from all of the nodes to which node 224 broadcast snoop requests. Referring to FIG. 2, the data state machine for the MAF 232 at node 224, having received the M-DATA response from the home node 228, transitions to the M-DATA state. Referring to FIG. 3, the conflict state machine for the MAF 232 at node 224, having received the XRDINVAL request from node 222, transitions to the CONFLICT state. Referring to Table 9, for the data state/conflict state combination of M-DATA and CONFLICT, the action taken at the source node 224 for the XRDINVAL MAF 232 is to transition to the FPP mode and reissue the request using an FPP request, as indicated at 236. It should be noted that, in the example illustrated in FIG. 8, even though there were conflicting MAFs 230 and 232, node 224 never "saw" the conflict (e.g., never received a CONFLICT response from node 220) because of the timing of the communications between the nodes.

In this case, neither of the requests from the source nodes 220 and 222 can be classified as "first ordered," so the hybrid coherency protocol transitions to the FPP mode and their requests are reissued according to the FPP. This allows the requests of nodes 220 and 222 to make forward progress. The hybrid cache coherency protocol described herein thus remains deterministic for the transaction by employing the FPP to resolve the XRDINVAL requests of nodes 220 and 222.

Figure 10:
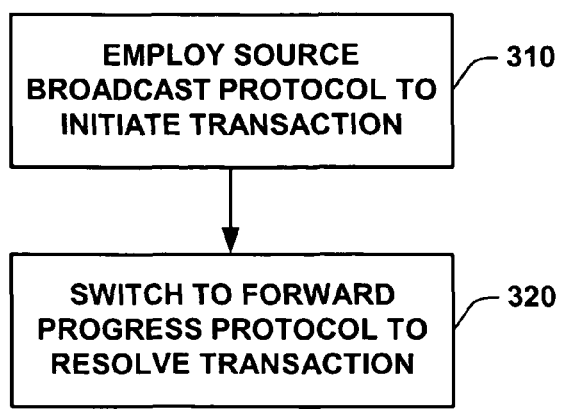
FIG. 10 depicts a flow diagram illustrating a method.

FIG. 10 depicts a method that includes employing a source broadcast protocol to initiate a transaction, as indicated at 310. The method also includes switching from the source broadcast protocol to a forward progress protocol to resolve the transaction if the transaction cannot be deterministically resolved by employing the source broadcast protocol, as indicated at 320.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system comprising:
a first node that employs a source broadcast protocol to initiate a transaction, the first node employing a forward progress protocol to resolve the transaction if the source broadcast protocol cannot provide a deterministic resolution of the transaction.

2. The system of claim 1, wherein the transaction comprises a request for data broadcast by the first node and a response to the request for data received by the first node.

3. The system of claim 2, wherein the request for data broadcast by the first node is identified as a first-ordered request based on an order in which a second node in the system receives the request for the data while operating as a cache ordering point for the data.

4. The system of claim 3, wherein the second node defines the cache ordering point for the data based on a cache state associated with the data at the second node.

5. The system of claim 3, wherein each other request for the data broadcast by other nodes in the system is identified as a not first request in response to the cache ordering point receiving each respective other request for the data after the cache ordering point receives the first-ordered request.

6. The system of claim 5, wherein the other requests for the data broadcast by the other nodes are identified as the not first requests based on respective conflict messages provided to the other nodes.

7. The system of claim 6, wherein one of the respective conflict messages comprises a forward progress protocol (FPP) message that inhibits classification of a source broadcast request for the data as the first-ordered request until preceding requests received by the cache ordering point have been serviced by the cache ordering point.

8. The system of claim 5, wherein the not first requests are ordered according to the forward progress protocol.

9. The system of claim 3, wherein the request for data broadcast by the first node is identified as the first-ordered request in response to a successful data response provided from the cache ordering point.

10. The system of claim 9, wherein the successful data response comprises an ownership data response.

11. The system of claim 10, wherein the first node provides a migration acknowledgment message to the cache ordering point to acknowledge receipt of the ownership data response at the first node, the migration acknowledgment message preventing other source broadcast requests for the data from being identified as the first-ordered request for the data until migration of the cache ordering point for the data has successfully completed.

12. The system of claim 3, wherein the source broadcast protocol enables the first node to cache the data and retire the request for the data after identifying the broadcast request from the first node as the first-ordered request.

13. The system of claim 3, wherein the first node is configured to employ the data received in response to the request for the data broadcast by the first node for a single use without caching the data if a shared data response and a conflict response are received in response to the source broadcast request for the data.

14. The system of claim 3, wherein the first node is operative to cache the data and retire the request for the data broadcast by the first node when a shared data response and no conflict responses are received in response to the source broadcast request for the data.

15. The system of claim 3, wherein the first node is operative to cache the data and retire the request for data broadcast by the first node when a memory data response and a read conflict response are received in response to the source broadcast request for the data.

16. The system of claim 1, wherein the first node defines a processor capable of communicating with other nodes of the system through an interconnect, the processor having an associated cache comprising a plurality of cache lines, each cache line having a respective tag address that identifies associated data and each cache line having state information that indicates a state of the associated data for each respective cache line, the processor having an associated cache controller operative to manage data requests and responses for the associated cache of the processor, the cache controller effecting state transitions associated with the data in the associated cache of the processor based on the data requests and responses for the associated cache of the processor.

17. The system of claim 1, wherein the forward progress protocol comprises one of a null-directory cache coherency protocol and a directory-based cache coherency protocol.

18. The system of claim 1, wherein the source broadcast protocol comprises a source snoop cache coherency protocol.

19. A multi-processor network comprising:
a first processor node employing a source broadcast protocol to initiate a transaction, the transaction including a source broadcast request for data and at least one response from at least one other processor node of the multi-processor network;
the first processor node switching from the source broadcast protocol to employ a forward progress protocol to resolve the transaction if the first processor node cannot provide a deterministic resolution of the transaction according to the source broadcast protocol.

20. The multi-processor network of claim 19, wherein the source broadcast request for data broadcast by the first processor node is identified as a first-ordered request in response to being the first request to arrive at a second processor node in the multi-processor network identified as a cache ordering point for the data.

21. The multi-processor network of claim 20, wherein requests for the data broadcast by other processor nodes in the multi-processor network are classified as not first requests in response to the requests arriving at the cache ordering point after the cache ordering point receives the first-ordered request.

22. The multi-processor network of claim 21, wherein conflict messages provided to each of the other processor nodes inhibits classification of a source broadcast request for the data as the first-ordered request until preceding requests received by the cache ordering point have been serviced by the cache ordering point.

23. The multi-processor network of claim 21, wherein each of the requests for the data broadcast by the other processor nodes is classified as not first requests are ordered according to the forward progress protocol.

24. The multi-processor network of claim 20, wherein the first processor node provides a migration acknowledgment message to the cache ordering point to acknowledge receipt of the ownership data response at the first node, the migration acknowledgment message preventing other source broadcast requests for the data from being classified as the first-ordered request for the data until migration of the cache ordering point for the data has successfully completed.

25. The multi-processor network of claim 20, wherein the source broadcast protocol enables the source broadcast request for the data that is identified as the first-ordered request to make forward progress according to the source broadcast protocol by caching the data at the first processor node and then by retiring the transaction associated with the source broadcast request for the data.

26. The multi-processor network of claim 20, wherein the first processor node employs the data received in response to the source broadcast request for the data for a single use without caching the data if the first processor node enters a shared data state and a conflict state based on responses to the source broadcast request for the data.

27. The multi-processor network of claim 20, wherein the first processor node is operative to cache the data in a cache line and retire the source broadcast request for the data in response to the first processor node associating a shared data state and a no-conflict conflict state with the cache line based on responses to the source broadcast request for the data.

28. The multi-processor network of claim 20, wherein the first processor node can cache the data in a cache line and retire the source broadcast read source broadcast request for the data in response to the first processor node associating a memory data state and a read-conflict conflict state with the cache line based on responses to the source broadcast request for the data.

29. A computer system comprising:
a first processor employing a source broadcast protocol to issue a source broadcast request;
at least one other processor employing the source broadcast protocol to further the source broadcast request by providing at least one response to the source broadcast request, the at least one response including a conflict message indicating that the source broadcast request conflicts with another source broadcast request issued by one of the at least one other processor or another processor; and
the first processor deterministically resolving the source broadcast request by employing a forward progress protocol if the first processor cannot deterministically resolve the source broadcast request according to the source broadcast protocol.

30. The computer system of claim 29, wherein the conflict message comprises a read conflict message, the response from the at least one other processor further comprising a data response from a second processor, the first processor employing the source broadcast protocol to deterministically resolve the source broadcast request and to fill a cache associated with the first processor based on data received in the data response from the second processor.

31. The computer system of claim 29, wherein the conflict message comprises a write conflict message, the response from the at least one other processor further including a data response from a second processor, the first processor deterministically resolving the source broadcast request by employing a forward progress protocol to fill a cache associated with the first processor if the first processor cannot deterministically resolve the source broadcast request according to the source broadcast protocol with the data response from the second processor.

32. The computer system of claim 31, wherein the conflict message comprises a forward progress protocol (FPP) conflict message, the first processor employing the forward progress protocol to deterministically resolve the source broadcast request and fill a cache associated with the first processor.

33. A system comprising:
means for initiating a transaction employing a source broadcast protocol comprising:
means for issuing a source broadcast request for data from a first node; and
means for receiving a response to the source broadcast request from at least one other node;
means for switching from the source broadcast protocol to a forward progress protocol to resolve the transaction if the transaction cannot be deterministically resolved according to the source broadcast protocol;
means for identifying the source broadcast request for data broadcast from the first node as a first-ordered request in response to being a first request for the data to be received by a second node in the system that comprises a cache ordering point for the data; and
means for classifying requests for the data broadcast by other nodes in the multi-processor network as not first requests in response to arriving at the cache ordering point after the cache ordering point receives the first-ordered request.

34. The system of claim 33, further comprising means for preventing classification of a given source broadcast request for the data as the first-ordered request until each preceding request for the data has been serviced according to the forward progress protocol.

35. The system of claim 33, further comprising means for ordering the not first requests using a forward progress protocol.

36. The system of claim 33, further comprising means for caching the data at the first node and for retiring a transaction associated with the source broadcast request for the data based on a set of responses received to the source broadcast request for the data after the first node has been classified as the first-ordered request.

37. A method comprising:
employing a source broadcast protocol to initiate a transaction; and
switching from the source broadcast protocol to a forward progress protocol (FPP) to resolve the transaction if the transaction cannot be deterministically resolved by employing the source broadcast protocol,
wherein the employing the source broadcast protocol to initiate the transaction further comprises issuing a source broadcast request for data from a first node; and the method further comprises classifying the source broadcast request for data from the first node as a first-ordered request in response to being a request first received by a second node that defines a cache ordering point for the data.

38. The method of claim 37, further comprising classifying other source broadcast requests for the data provided from other nodes as not first requests in response to the other source broadcast requests arriving at the cache ordering point after the first-ordered request.

39. The method of claim 38, further comprising preventing other source broadcast requests for the data from being classified as first requests until all source broadcast requests previously classified as not first requests have been completed.

40. The method of claim 39, further comprising ordering the not first requests by employing the forward progress protocol.

41. The method of claim 37, further comprising enabling the source broadcast request for the data that is identified as the first-ordered request to make forward progress according to the source broadcast protocol by caching the data at the first node and then retiring the transaction associated with the source broadcast request for the data.

* * * * *